US012095196B2

(12) United States Patent
Kozono et al.

(10) Patent No.: US 12,095,196 B2
(45) Date of Patent: Sep. 17, 2024

(54) CONNECTOR

(71) Applicant: Yazaki Corporation, Tokyo (JP)

(72) Inventors: Seiji Kozono, Kakegawa (JP); Yoshitaka Tsushima, Fujieda (JP); Masaya Okamoto, Fujieda (JP); Tomoki Matsukawa, Fujieda (JP)

(73) Assignee: Yazaki Corporation, Tokyo (JP)

( * ) Notice: Subject to any disclaimer, the term of this patent is extended or adjusted under 35 U.S.C. 154(b) by 459 days.

(21) Appl. No.: 17/682,492

(22) Filed: Feb. 28, 2022

(65) Prior Publication Data

US 2022/0278474 A1 Sep. 1, 2022

(30) Foreign Application Priority Data

Mar. 1, 2021 (JP) ................................ 2021-031855
Jun. 23, 2021 (JP) ................................ 2021-104439

(51) Int. Cl.
*H01R 13/453* (2006.01)

(52) U.S. Cl.
CPC ..... *H01R 13/4536* (2013.01); *H01R 2201/26* (2013.01)

(58) Field of Classification Search
CPC .............. H01R 13/5213; H01R 13/502; H01R 13/5202; H01R 13/4536; H01R 2201/26
See application file for complete search history.

(56) References Cited

U.S. PATENT DOCUMENTS 5,385,480 A 1/1995 Hoffman
5,716,224 A 2/1998 Masuda et al.
10,940,984 B2 * 3/2021 Ponticelli, Sr. ..... E05B 47/0001
2013/0126205 A1 * 5/2013 Henmi ................. H01H 35/003 174/53
2019/0081438 A1 * 3/2019 Yamane ................. H01R 13/44
2022/0006240 A1 * 1/2022 Chapel ................... H01R 13/20

FOREIGN PATENT DOCUMENTS

CN 113302804 A * 8/2021 ......... H01R 13/4532
JP H08-138785 A 5/1996
JP 2004095514 A * 3/2004

* cited by examiner

*Primary Examiner* — Jean F Duverne
(74) *Attorney, Agent, or Firm* — Banner & Witcoff, Ltd.

(57) ABSTRACT

There is provided a connector including: a housing that houses a connection terminal; an outer case that houses and holds the housing; a movable case that includes first cam grooves formed penetratingly in side walls of the movable case, and that is movably disposed inside the outer case in a connector fitting direction; a shutter including a shutter front wall that covers a front opening of the housing, and shutter bosses projecting to outer surfaces of shutter side walls and engaging with the first cam grooves; and a spring that elastically urges the movable case toward a side of the mating connector. The first cam grooves engage with the shutter bosses, such that the shutter is rotated in an opening and closing direction around the shutter bosses in conjunction with the movable case moving.

8 Claims, 20 Drawing Sheets

CONNECTOR

CROSS-REFERENCE TO RELATED APPLICATIONS

This application is based on and claims priority under 35 USC 119 from Japanese Patent Application No. 2021-031855 filed on Mar. 1, 2021 and Japanese Patent Application No. 2021-104439 filed on Jun. 23, 2021, the contents of which are incorporated herein by reference.

TECHNICAL FIELD

The present disclosure relates to a connector including a shutter mechanism.

BACKGROUND ART

In the related art, wire harnesses (electric wires) for electrically connecting various electrical components mounted on an automobile or the like are connected by a connector. Such a connector is usually constituted by a male connector and a female connector. For example, in a case of a connector configuration that applies to an optional specification, one of the connectors connected to an end portion of a pre-arranged electric wire is known to include a shutter mechanism at a front opening of a housing for the purpose of dust protection, terminal protection, electric shock prevention to surroundings, and the like before the other connector is fitted thereto. Especially in electric vehicles, a connector with a shutter mechanism (inlet) is applied to prevent electric shock accidents and the like, so that terminals can be prevented from being exposed at the front opening when the connector is not connected. As an example of such a configuration, for example, there is a connector with a shutter mechanism disclosed in JPH08-138785A.

In the connector with a shutter mechanism, one connector is provided with a shutter that rotates outward when an external force is applied to a front surface portion thereof, and the other connector is provided with a tip portion, so that when the connectors are fitted to each other, the tip portion presses the front surface portion of the shutter of the one connector to rotate the shutter.

In the connector with a shutter mechanism disclosed in JPH08-138785A, when the connectors are fitted to each other, the tip portion (fitting hood portion) of the mating connector presses the front surface portion of the shutter, so that the shutter rotates outward (forward) around a pin and opens. Therefore, it is necessary to avoid interference when the connectors are fitted to each other by setting a stroke (connector size) of the mating connector in consideration of a rotation locus of the shutter opening. Therefore, the fitting hood portion of the mating connector becomes long by an amount of a space required for the shutter to open and close, and the connector size becomes large.

The shutter is constantly urged toward inside of a housing by a coil spring, and is configured to close the front opening of the housing when the connector is not connected. As the coil spring that constantly urges the shutter toward a closing direction, for example, a torsion coil spring wound around the pin that supports the shutter is used. The coil spring is located near the front opening of the housing and is easily affected by dust, water, and the like. Therefore, the connector with a shutter mechanism in the related art tends to have a high risk of spring dysfunction.

SUMMARY OF INVENTION

The present disclosure provides a compact connector with a shutter mechanism and a guaranteed spring function.

According to an illustrative aspect of the present disclosure, a connector includes: a housing that houses a connection terminal; an outer case that houses and holds the housing; a movable case that includes first cam grooves formed penetratingly in side walls of the movable case corresponding to each of both side walls of the outer case, and that is movably disposed inside the outer case in a connector fitting direction; a shutter including a shutter front wall that covers a front opening of the housing to which a mating connector is fitted, shutter side walls provided at both end portions of the shutter front wall, and shutter bosses projecting to outer surfaces of the shutter side walls and engaging with the first cam grooves; and a spring that elastically urges the movable case toward a side of the mating connector. The first cam grooves engage with the shutter bosses, such that the shutter is rotated in an opening and closing direction around the shutter bosses in conjunction with the movable case moving.

The present disclosure has been briefly described as above. Details of the present disclosure will be further clarified by reading an aspect (hereinafter, referred to as an "embodiment") for implementing the invention to be described below with reference to the accompanying drawings.

BRIEF DESCRIPTION OF DRAWINGS

FIGS. 8A and 8B are diagrams illustrating the fitting start state of the inlet and the inlet plug according to the first embodiment of the present disclosure, in which FIG. 8A is a main part side view of the inlet in which a cover covering third cam grooves is omitted, and FIG. 8B is a main part vertical sectional view of the inlet;

FIGS. 9A and 9B are diagrams illustrating a state during fitting of the inlet and the inlet plug according to the first embodiment of the present disclosure, in which FIG. 9A is a main part side view of the inlet in which the cover covering the third cam grooves is omitted, and FIG. 9B is a main part vertical sectional view of the inlet;

FIGS. 10A and 10B are diagrams illustrating a state after fitting of the inlet and the inlet plug according to the first embodiment of the present disclosure, in which FIG. 10A is a main part side view of the inlet in which the cover covering the third cam grooves is omitted, and FIG. 10B is a main part vertical sectional view of the inlet;

FIGS. 11A and 11B are front views of the inlet shown in FIG. 1, in which FIG. 11A shows a close state in which a front opening of a housing is covered with the shutter, and FIG. 11B shows an open state in which the front opening of the housing is opened;

FIGS. 16A and 16B are diagrams illustrating a fitting start state of the inlet according to the second embodiment of the present disclosure and the inlet plug, in which FIG. 16A is a main part side view of the inlet in which a cover covering third cam grooves is omitted, and FIG. 16B is a main part vertical sectional view of the inlet;

FIGS. 17A and 17B are diagrams illustrating a state immediately after fitting of the inlet according to the second embodiment of the present disclosure and the inlet plug, in which FIG. 17A is a main part side view of the inlet in which the cover covering the third cam grooves is omitted, and FIG. 17B is a main part vertical sectional view of the inlet;

FIGS. 18A and 18B are diagrams illustrating a state during fitting of the inlet according to the second embodiment of the present disclosure and the inlet plug, in which FIG. 18A is a main part side view of the inlet in which the cover covering the third cam grooves is omitted, and FIG. 18B is a main part vertical sectional view of the inlet;

FIGS. 19A and 19B are diagrams illustrating the state during fitting of the inlet according to the second embodiment of the present disclosure and the inlet plug, in which FIG. 19A is a main part side view of the inlet in which the cover covering the third cam grooves is omitted, and FIG. 19B is a main part vertical sectional view of the inlet; and FIGS. 20A and 20B are diagrams illustrating a state after fitting of the inlet according to the second embodiment of the present disclosure and the inlet plug, in which FIG. 20A is a main part side view of the inlet in which the cover covering the third cam grooves is omitted, and FIG. 20B is a main part vertical sectional view of the inlet.

DESCRIPTION OF EMBODIMENTS

Hereinafter, embodiments according to the present disclosure will be described with reference to the drawings.

Figure 1:
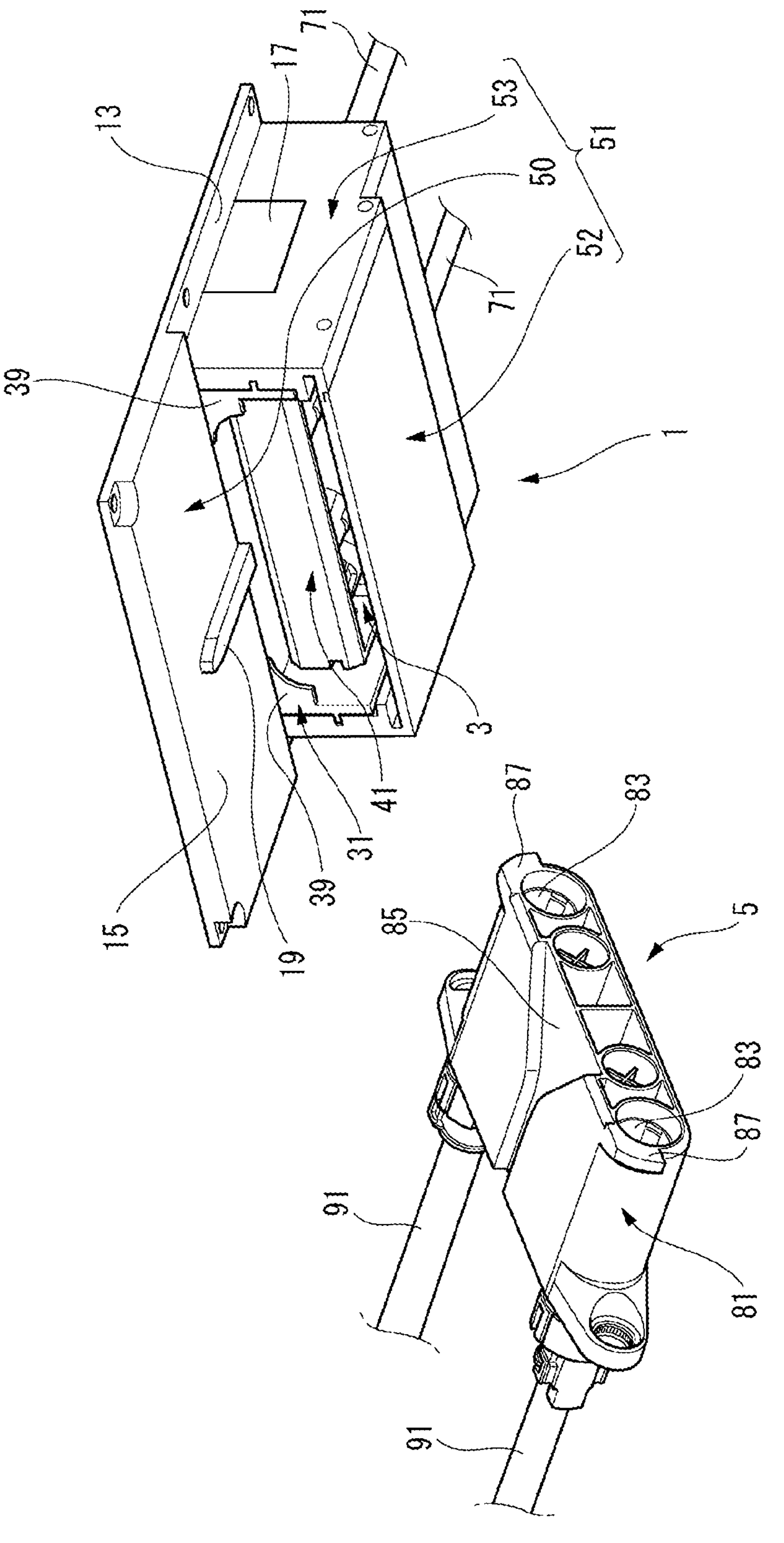
FIG. 1 is a perspective view showing an inlet and an inlet plug, which is a mating connector fitted to the inlet, constituting a connector according to a first embodiment of the present disclosure.
Figure 2:
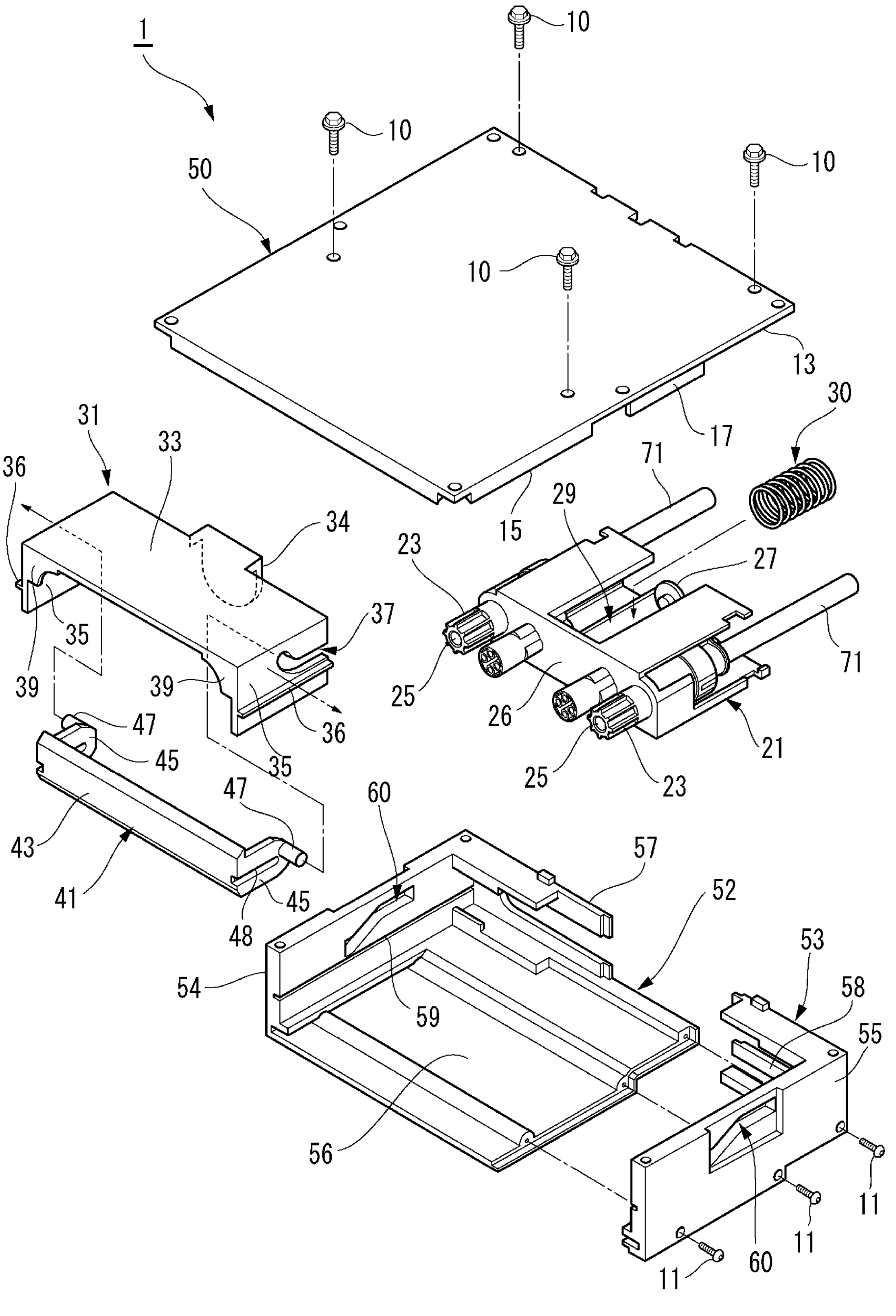
FIG. 2 is an exploded perspective view of the inlet shown in FIG. 1.
Figure 3:
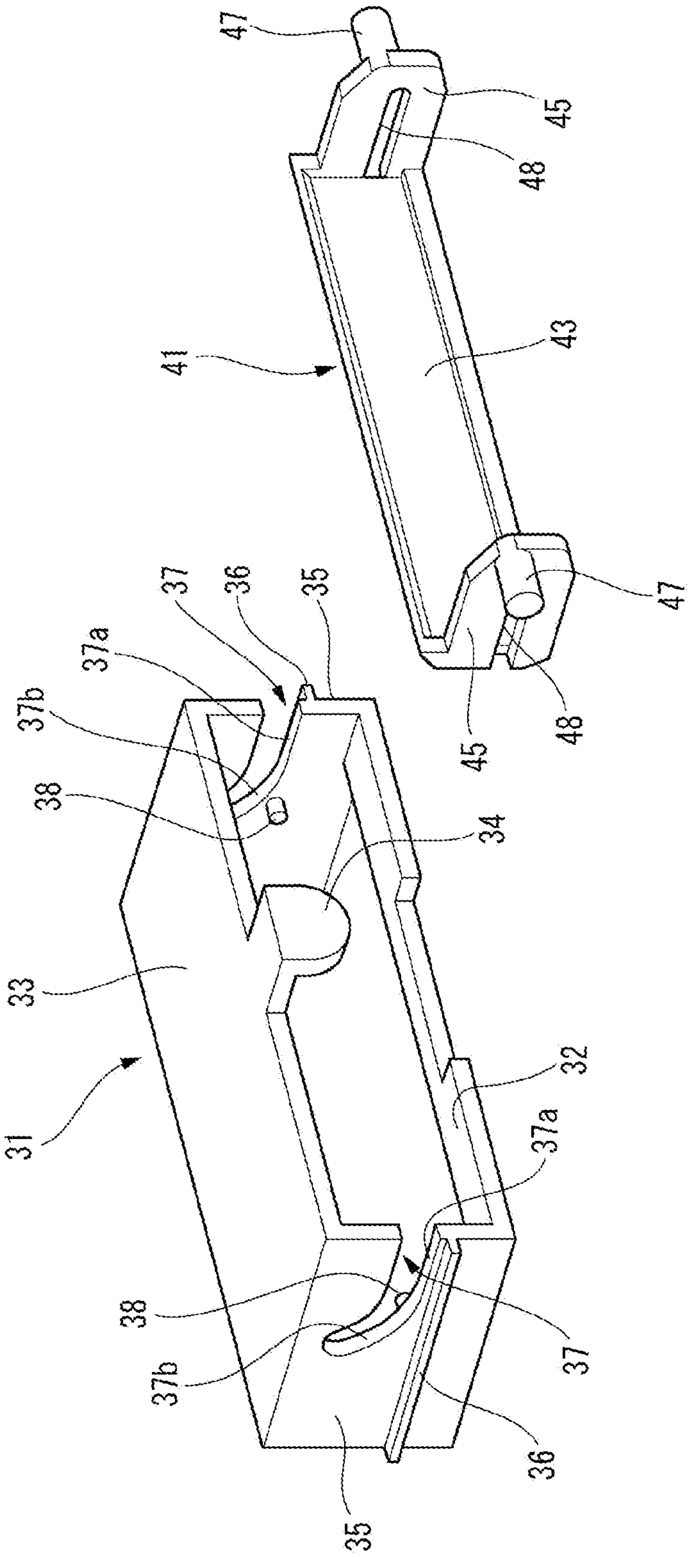
FIG. 3 is a perspective view from a rear side of a movable case and a shutter shown in FIG. 2.
Figure 4:
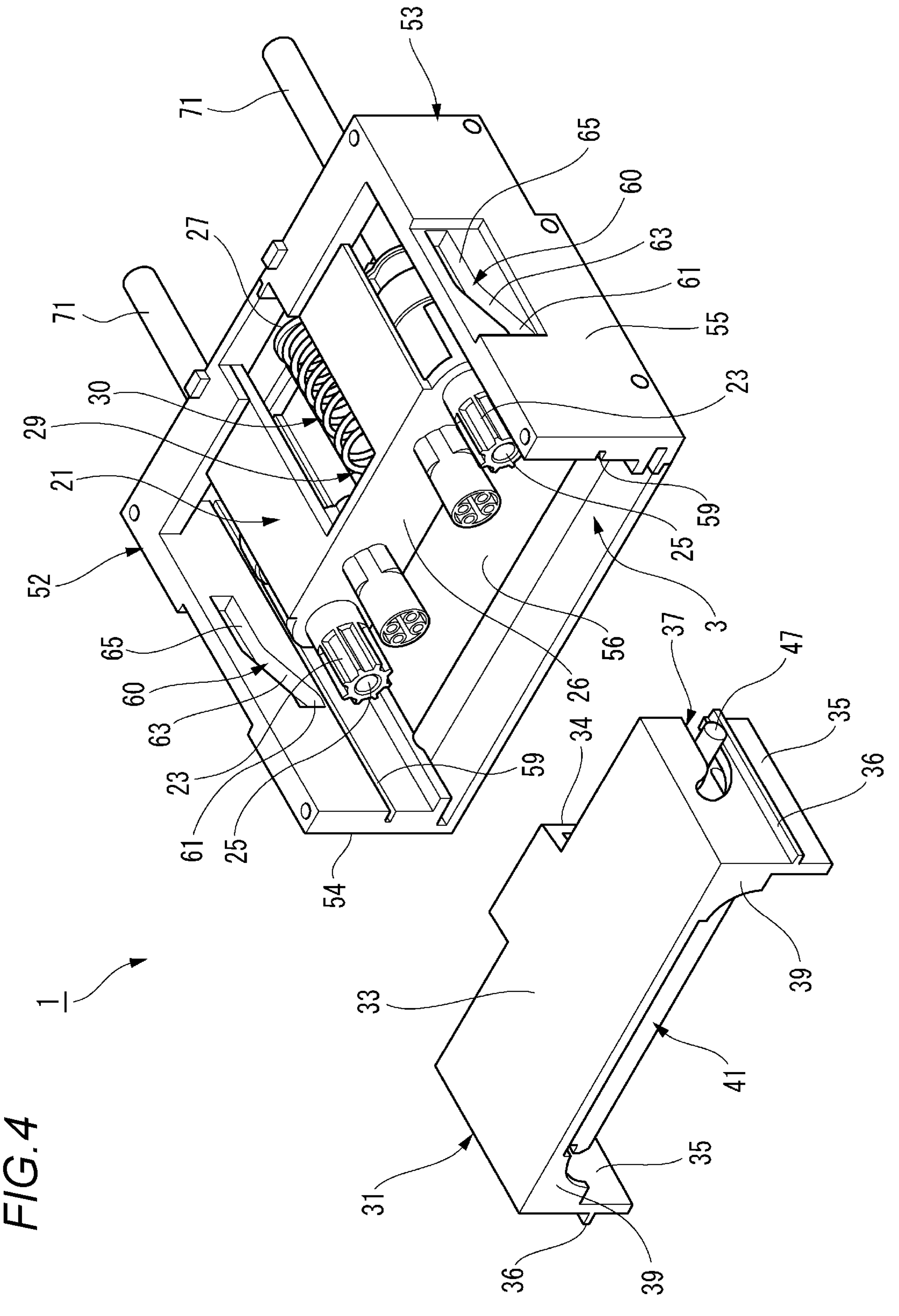
FIG. 4 is a perspective view of a state in which the movable case to which the shutter is attached is separated from an outer case shown in FIG. 1 whose top plate is omitted.

FIG. 1 is a perspective view showing an inlet 1 and an inlet plug 5, which is a mating connector fitted to the inlet 1, constituting a connector according to a first embodiment of the present disclosure. FIG. 2 is an exploded perspective view of the inlet 1 shown in FIG. 1. FIG. 3 is a perspective view from a rear side of a movable case 31 and a shutter 41 shown in FIG. 2. FIG. 4 is a perspective view of a state in which the movable case 31 to which the shutter 41 is attached is separated from an outer case 51 shown in FIG. 1.

Figure 6:
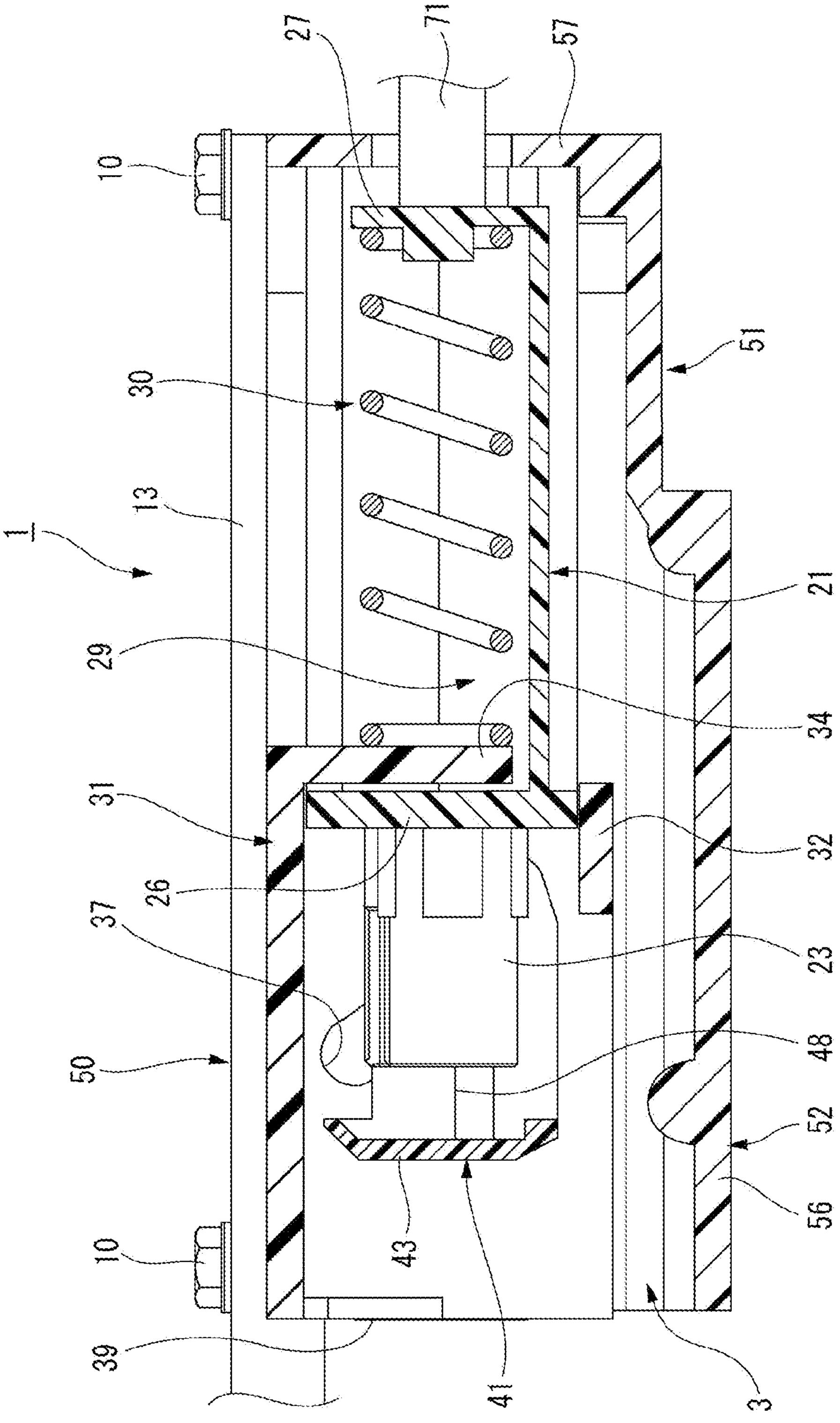
FIG. 6 is a vertical sectional view of a central portion of the inlet shown in FIG. 1.
Figure 7:
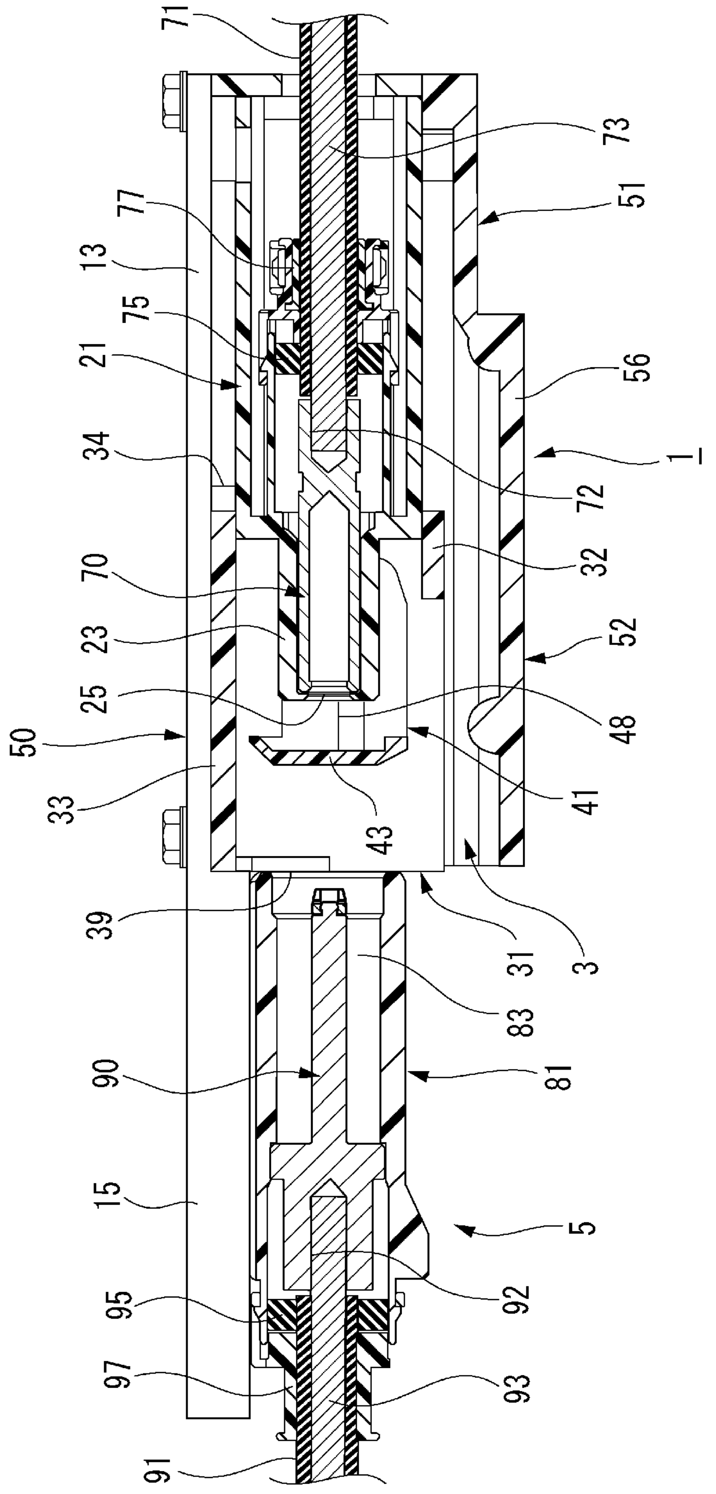
FIG. 7 is a vertical sectional view showing a fitting start state of the inlet and the inlet plug shown in FIG. 1.

As shown in FIGS. 1 and 2, the inlet 1, which is a connector according to the first embodiment, includes a housing 21 that houses a connection terminal 70, the outer case 51 that houses and holds the housing 21, the movable case 31 that is movably disposed inside the outer case 51 in a connector fitting direction, the shutter 41 that covers a front opening 25 of the housing 21 into which a plug housing 81 of the inlet plug (mating connector) 5 is fitted, and a spring 30 that elastically urges the movable case 31 toward the inlet plug 5 side (see FIGS. 6 and 7).

In the present description, a front-rear direction is a direction along the connector fitting direction of the housing 21 (left-right direction in FIG. 7), a side where the plug housing 81 of the inlet plug 5 is fitted is a front side, an up-down direction is a direction in which the shutter 41 opens and closes (up-down direction in FIG. 7) orthogonal to the connector fitting direction of the housing 21, and a top plate 50 side of the outer case 51 is an upper side.

The housing 21 is molded from an electrically insulating synthetic resin. A front wall 26 of the housing 21 is provided with a pair of terminal accommodating cylinder portions 23, 23 protruding toward the inlet plug 5 side.

The connection terminal 70 connected to a terminal portion of a high-voltage cable 71 is accommodated in the terminal accommodating cylinder portion 23. A front end of the terminal accommodating cylinder portion 23 is formed with the front opening 25 into which a connection terminal 90 of the inlet plug 5 is inserted. The high-voltage cable 71 connected to the connection terminal 70 is pulled out from a rear opening of the terminal accommodating cylinder portion 23.

The connection terminal 70 is a female terminal made of a conductive metal material and is formed in a cylindrical rod shape. The connection terminal 70 includes a rear end portion formed with a joint hole 72. A conductor 73 of the high-voltage cable 71 pulled out from the rear opening of the terminal accommodating cylinder portion 23 is inserted into the joint hole 72 and caulked (see FIG. 7).

A seal member 75 is attached to the high-voltage cable 71 pulled out from the rear opening of the terminal accommodating cylinder portion 23, and is liquid-tightly sealed to the terminal accommodating cylinder portion 23. The seal member 75 is restricted from being detached by a rear holder 77 attached to a rear end of the terminal accommodating cylinder portion 23.

As shown in FIG. 2, a semi-cylindrical spring accommodating portion 29 for accommodating the spring 30, which is a compression coil spring, along the connector fitting direction is provided in a central portion of the housing 21. The spring 30 accommodated in the spring accommodating portion 29 is interposed between a spring receiving portion 34 of the movable case 31, which will be described later, and a spring support portion 27 provided on a rear wall of the housing 21, so that the movable case 31 is elastically urged toward the inlet plug 5 side.

As shown in FIG. 2, the outer case 51 is a flat housing made of a first housing 52, a second housing 53, and the top plate 50. An opening 3 into which a tip portion of the inlet plug 5 is inserted is defined in front of the outer case 51.

In the first housing 52, a rectangular bottom wall 56, a side wall 54 erected on one side edge of the bottom wall 56, and a rear wall 57 connected to the bottom wall 56 and a rear edge of the side wall 54 are integrally formed.

In the second housing 53, a side wall 55 facing the side wall 54 and a rear wall 58 connected to a rear edge of the side wall 55 are integrally formed.

Each of the side wall 54 and the side wall 55, which are two side walls of the outer case 51, is penetratingly formed with a third cam groove 60 for passively guiding a shutter boss 47 of the shutter 41, which will be described later, along the connector fitting direction. The third cam groove 60 includes a reference portion 61 located at an intermediate portion in a height direction of the side wall 54 and the side wall 55 in the outer case 51 at the inlet plug 5 side end, a third displacement cam portion 63 extending diagonally upward from the reference portion 61 toward a rear side of the side wall 54 and the side wall 55 (in FIG. 8A, diagonally upward to a right side), and a parallel portion 65 extending from the third displacement cam portion 63 toward the rear side of the side wall 54 and the side wall 55 in parallel with the connector fitting direction.

The inlet 1 of the first embodiment is configured to be in a shutter open position by rotating a shutter front wall 43 of the shutter 41 toward the bottom wall 56 side of the outer case 51. Therefore, the third displacement cam portion 63 of the third cam groove 60 is configured to extend diagonally upward from the reference portion 61 toward the rear side of the side wall 54 and the side wall 55. When the shutter front wall 43 is rotated toward the top plate 50 side of the outer case 51 to be in the shutter open position, the third displacement cam portion 63 of the third cam groove 60 is formed to extend diagonally downward from the reference portion 61 toward the rear side of the side wall 54 and the side wall 55.

Guide grooves 59 extending in the connector fitting direction are recessed on inner surfaces of the side wall 54 and the side wall 55 so as to face each other to guide a guide rib 36 of the movable case 31, which will be described later, in a sliding manner. The high-voltage cable 71 pulled out from the housing 21 is led out from an opening formed on the rear wall 57 and the rear wall 58, which constitute a rear wall of the outer case 51.

The top plate 50 includes an eaves portion 15 extending in front of an upper wall portion 13 that defines a housing accommodation space together with the first housing 52 and the second housing 53.

A pair of cover portions 17, 17 for covering the third cam grooves 60 penetratingly formed on the two side walls of the outer case 51 are vertically provided on lower surfaces of two side portions of the upper wall portion 13. On a lower surface at a central portion of the eaves portion 15, a pick-up rib 19 for guiding fitting of the plug housing 81 of the inlet plug 5 to the housing 21 housed in the outer case 51 extends along the connector fitting direction.

As shown in FIGS. 2 and 3, the movable case 31 is a frame body having a U-shaped cross section including a rectangular movable case upper wall 33 and a pair of movable case side walls 35, 35 suspended downward from both side edges of the movable case upper wall 33. Rear sides of lower end portions of the pair of movable case side walls 35, 35 are connected by a connecting portion 32 to prevent inward tilting.

A projecting piece-shaped spring receiving portion 34 projecting downward is formed in a central portion of a rear end of the movable case upper wall 33.

A first cam groove 37 is penetratingly formed on the movable case side walls 35, 35 corresponding to the side wall 54 and the side wall 55, which are the two side walls of the outer case 51, respectively. The first cam groove 37 is formed by a notch opening extending diagonally upward from a rear end of the movable case side wall 35 toward a front side, and includes a boss insertion portion 37*a* formed by a horizontal portion extending from the rear side to the front side, and a first rotating cam portion 37*b* formed by a continuous curved portion at a front end of the boss insertion portion 37*a*.

The guide rib 36 extending along the connector fitting direction is projected on an outer surface of the movable case side wall 35, and a movable case boss 38 is projected on an inner surface of the movable case side wall 35. The movable case boss 38 is located below the first rotating cam portion 37*b* in the first cam groove 37.

Front ends of intersection parts between the movable case side walls 35, 35 and the movable case upper wall 33 in the movable case 31 are each provided with a contact portion 39 pressed and urged by a pressing portion 87 at the tip portion of the inlet plug 5.

The shutter 41 includes the shutter front wall 43, shutter side walls 45, 45 suspended at both end portions of the shutter front wall 43, and a shutter boss 47 that is projected to an outer surface of each shutter side wall 45 and engages with the first cam groove 37 of the movable case 31. The shutter bosses 47 are located on an extending end side (opposite to the shutter front wall 43) of the shutter side walls 45, 45 suspended at both end portions of the shutter front wall 43, and serve as a rotation center of the shutter front wall 43 rotated in an opening and closing direction.

The flat plate-shaped shutter front wall 43 covers the front openings 25 of the pair of terminal accommodating cylinder portions 23, 23 protruding from the front wall 26 of the housing 21 housed in the outer case 51, respectively, so that the connection terminal 70 can be prevented from being exposed at the front openings 25 when the inlet 1 is not connected.

On the shutter side wall 45, a second cam groove 48 that engages with the movable case boss 38 of the movable case 31 is formed linearly along a direction orthogonal to the shutter front wall 43.

Therefore, the shutter 41 is mounted on the movable case 31 in a state Where the shutter boss 47 is engaged with the corresponding first cam groove 37 and the second cam groove 48 is engaged with the corresponding movable case boss 38.

Next, a procedure for assembling the inlet 1 described above will be described.

Figure 5:
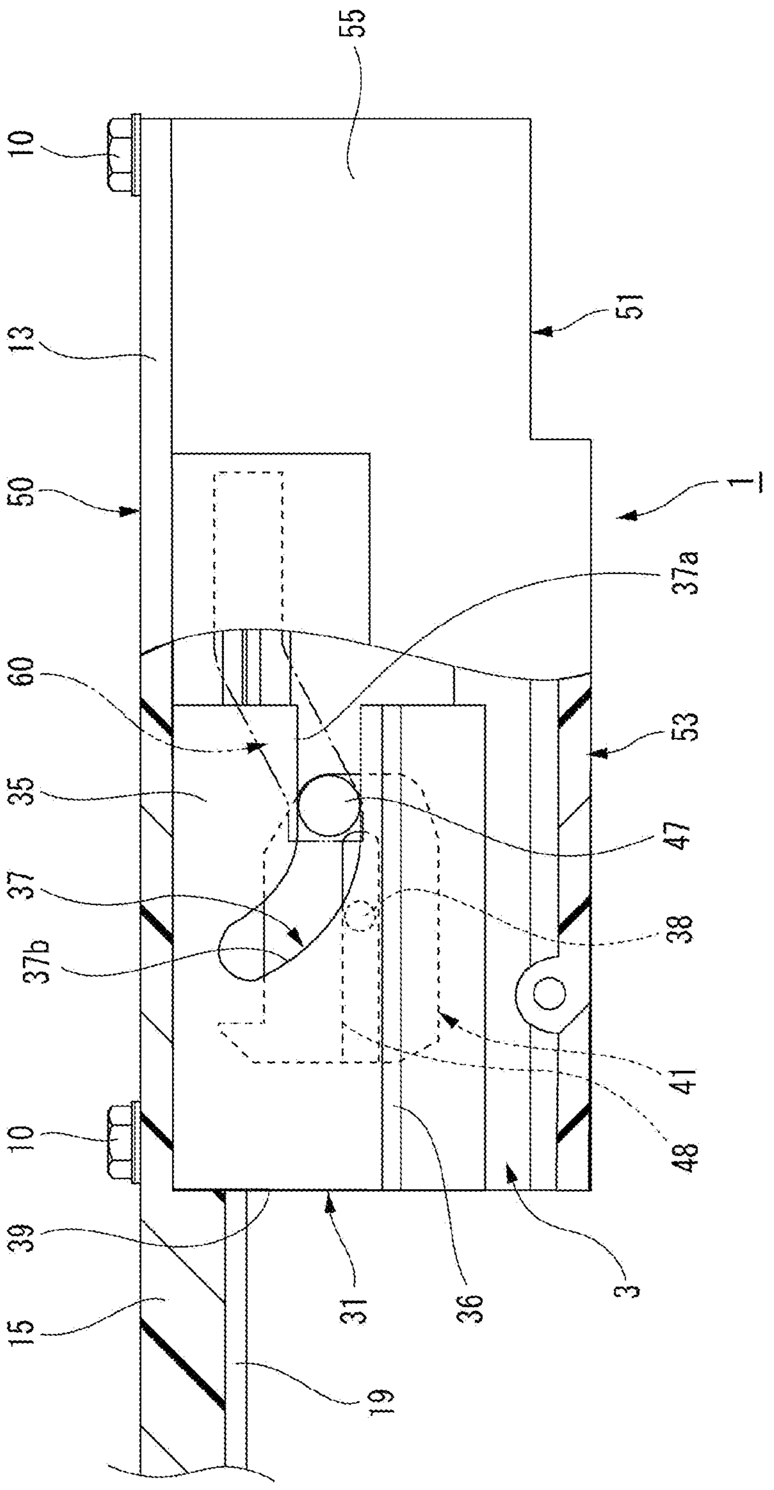
FIG. 5 is a main part enlarged side view in which a part of the inlet shown in FIG. 1 is broken.

FIG. 5 is a main part enlarged side view in which a part of the inlet 1 shown in FIG. 1 is broken. FIG. 6 is a vertical sectional view of a central portion of the inlet shown in FIG. 1.

First, the housing 21 houses the connection terminal 70 is disposed at a predetermined position on the bottom wall 56 of the first housing 52, the movable case 31 to which the shutter 41 is attached is disposed at a predetermined position of the first housing 52, and the second housing 53 is fixed to the first housing 52 by a screw 11.

In this case, in the movable case 31, the pair of guide ribs 36, 36 are engaged with the corresponding guide grooves 59 of the outer case 51, respectively. Then, the movable case 31 is movable relative to the outer case 51 along the connector fitting direction.

As shown in FIG. 5, in the shutter 41 attached to the movable case 31, each of the pair of shutter bosses 47, 47 penetrating the first cam groove 37 is engaged with the corresponding third cam groove 60 of the outer case 51. The shutter 41 is movable with respect to the outer case 51 along the connector fitting direction in conjunction with movement of the movable case 31.

As shown in FIG. 6, when the movable case 31 is disposed at a predetermined position in the first housing 52, the spring receiving portion 34 is inserted between a front end of the spring 30 accommodated in the spring accommodating portion 29 and the front wall 26 of the housing 21. Therefore, the movable case 31 is elastically urged to the front side of housing 21, which is the inlet plug 5 side.

Finally, the top plate 50 is fixed to upper portions of the first housing 52 and the second housing 53 by screws 10, and the assembly of the inlet 1 is completed. The assembled inlet 1 is attached to, for example, a vehicle body of an electric vehicle via the top plate 50. Here, an up-down direction of the vehicle body is the up-down direction of the inlet 1 when being attached to the vehicle body, but a mounting direction is not limited thereto.

Here, functions of the first cam groove 37 of the movable case 31, the second cam groove 48 of the shutter 41, and the third cam groove 60 of the outer case 51 will be described.

When the inlet 1 and the inlet plug 5 are not fitted to each other, as shown in FIG. 5, the movable case 31 is located on the inlet plug 5 side with respect to the outer case 51 due to an elastic urging force of the spring 30 (left side in FIG. 5). In this case, the shutter boss 47 is located at the boss insertion portion 37*a* of the first cam groove 37, and the tip portion thereof is located at the reference portion 61 of the third cam groove 60. Therefore, the shutter 41 in which the second cam groove 48 is engaged with the movable case boss 38 is at a shutter close position (see FIG. 11A) in which the shutter front wall 43 covers the front opening 25 of the housing 21.

When the movable case 31 moves against the elastic urging force of the spring 30 to a side opposite to the inlet plug 5 (right side in FIG. 5) with respect to the outer case 51, the shutter boss 47 reaches the first rotating cam portion 37*b* of the first cam groove 37. Thus, the shutter 41, whose rotation is supported when moving along the connector mating direction by the second cam groove 48 engaging with (following) the movable case boss 38, is at a shutter open position (see FIG. 11B) in which the shutter front wall 43 is rotated downward with the shutter boss 47 as a center of rotation. When the movable case 31 moves to the side opposite to the inlet plug 5 (the right side in FIG. 5) with respect to the outer case 51, the shutter boss 47 reaches the third displacement cam portion 63 of the third cam groove 60. Therefore, in the shutter 41 rotated to the shutter open position, the shutter front wall 43, which is a rotation tip (free end), is displaced toward the shutter boss 47 side (upper side in FIG. 5), which is a center of rotation. The movable case 31 further moves to the side opposite to the inlet plug 5 with respect to the outer case 51, and the shutter boss 47 reaches the parallel portion 65 of the third cam groove 60. Thus, the shutter 41 moves in parallel to the rear side of the outer case 51 in a state of being rotated to the shutter open position.

FIG. 7 is a vertical sectional view showing a fitting start state of the inlet 1 and the inlet plug 5 shown in FIG. 1.

As shown in FIGS. 1 and 7, the inlet plug 5 fitted and electrically connected to the inlet 1 includes the connection terminal 90 fitted to the connection terminal 70 of the inlet 1, and the plug housing 81 including a pair of terminal accommodating chambers 83, 83 accommodating the connection terminal 90.

The plug housing 81 is molded from an electrically insulating synthetic resin. Pressing portions 87, 87 that can press and urge against the contact portions 39, 39 of the movable case 31 are provided on both sides of a tip portion of the plug housing 81. A fitting guide groove 85 is formed on an upper surface of the plug housing 81. The fitting guide groove 85 includes a tapered portion whose width increases toward the inlet 1. When the inlet plug 5 is fitted to the inlet 1, the fitting guide groove 85 can guide fitting of the plug housing 81 to the housing 21 by engaging with the pick-up rib 19 provided on the top plate 50 of the inlet 1.

The connection terminal 90 connected to a terminal portion of a high-voltage cable 91 is accommodated in the terminal accommodating chamber 83. The high-voltage cable 91 connected to the connection terminal 90 is pulled out from a rear opening of the terminal accommodating chamber 83.

The connection terminal 90 is a male terminal made of a conductive metal material and is formed in a cylindrical rod shape. The connection terminal 90 includes a rear end portion formed with a joint hole 92. A conductor 93 of the high-voltage cable 91 pulled out from the rear opening of the terminal accommodating chamber 83 is inserted into the joint hole 92 and caulked.

A seal member 95 is attached to the high-voltage cable 91 pulled out from the rear opening of the terminal accommodating chamber 83, and is liquid-tightly sealed to the terminal accommodating chamber 83. The seal member 95 is restricted from being detached by a rear holder 97 attached to a rear end of the terminal accommodating chamber 83.

Next, fitting of the inlet 1 and the inlet plug 5 will be described.

Figure 8A:
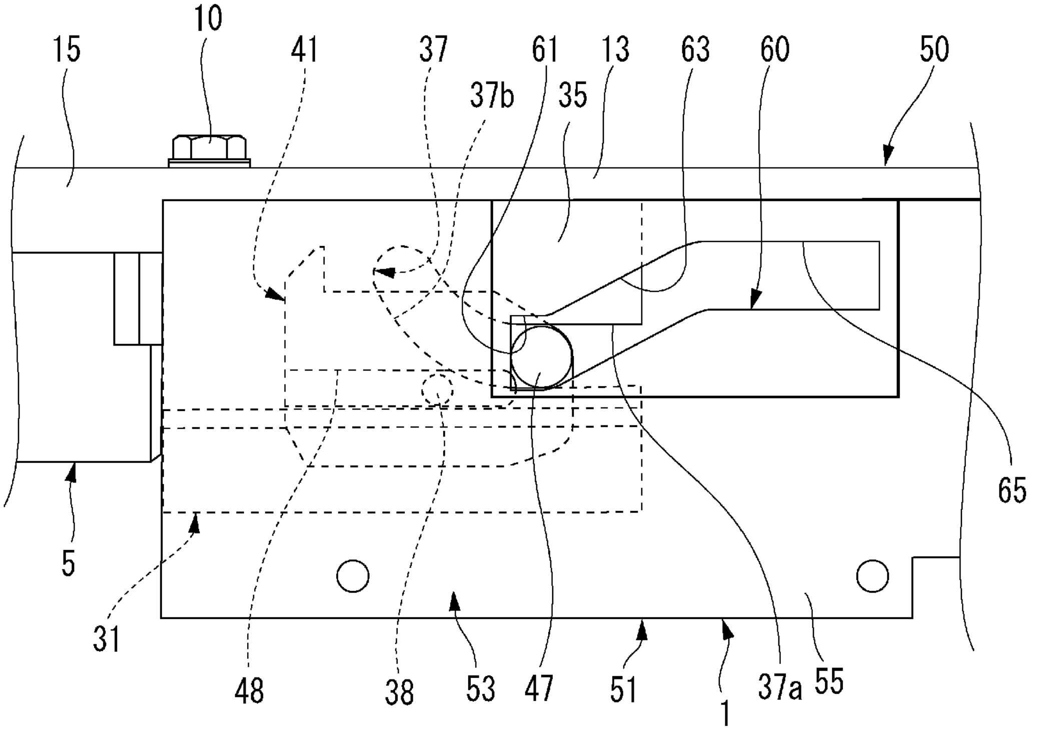
Figure 8B:
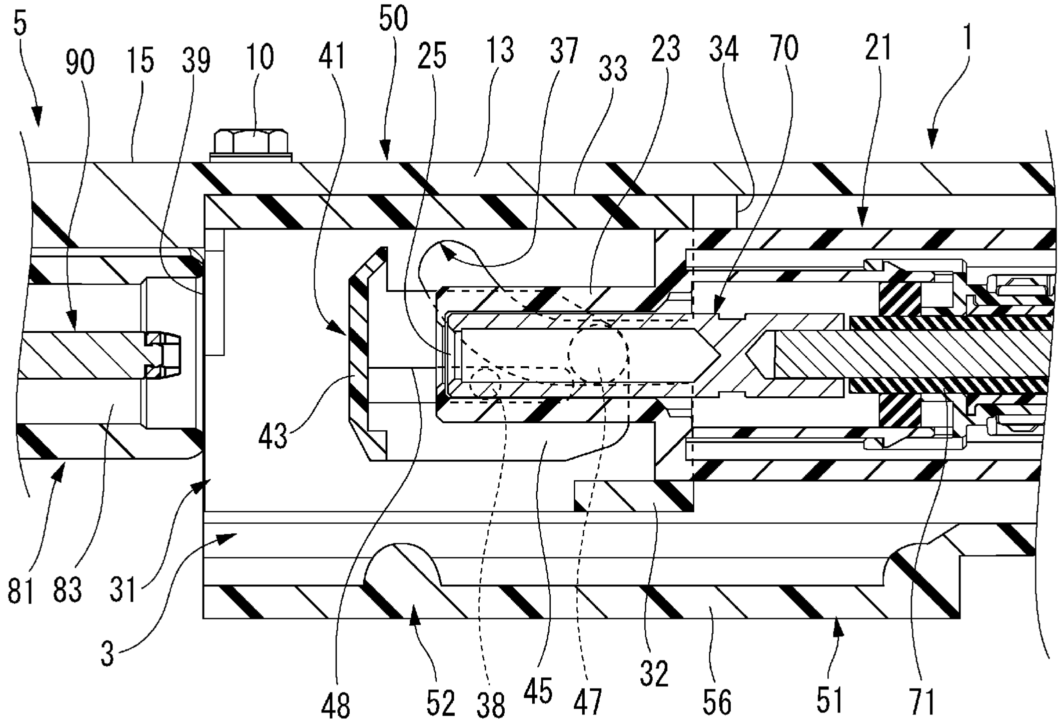

FIGS. 8A and 8B are diagrams illustrating the fitting start state of the inlet 1 and the inlet plug 5. FIGS. 9A, 9B and FIGS. 10A, 10B are diagrams illustrating states during and after fitting of the inlet 1 and the inlet plug 5. FIGS. 11A and 11B are front views of the inlet 1 shown in FIG. 1, in which FIG. 11A shows a close state in which the front opening 25 of the housing 21 is covered with the shutter 41, and FIG. 11B shows an open state in which the front opening 25 of the housing 21 is opened.

As shown in FIG. 7 and FIGS. 8A and 8B, when the inlet 1 and the inlet plug 5 are not fitted to each other, the movable case 31 is located on the inlet plug 5 side with respect to the outer case 51 (the left side in FIG. 5). In this case, the shutter boss 47 is located at the boss insertion portion 37*a* of the first cam groove 37, and the tip portion thereof is located at the reference portion 61 of the third cam groove 60. Therefore, as shown in FIG. 11A, the shutter 41 in which the second cam groove 48 is engaged with the movable case boss 38 is at the shutter close position in which the shutter front wall 43 covers the front opening 25 of the housing 21.

Therefore, the connection terminal 70 of the inlet 1 is not exposed due to the closed shutter 41. In this way, the inlet 1 is dustproof, terminal protected, and electric shock protected.

From such a state, insertion and fitting of the inlet plug 5 into the inlet 1 is started. First, from the state in FIGS. 8A and 8B, the inlet plug 5 is moved to the inlet 1 side, and the insertion and fitting of the plug housing 81 into the outer case 51 is started.

Figure 9A:
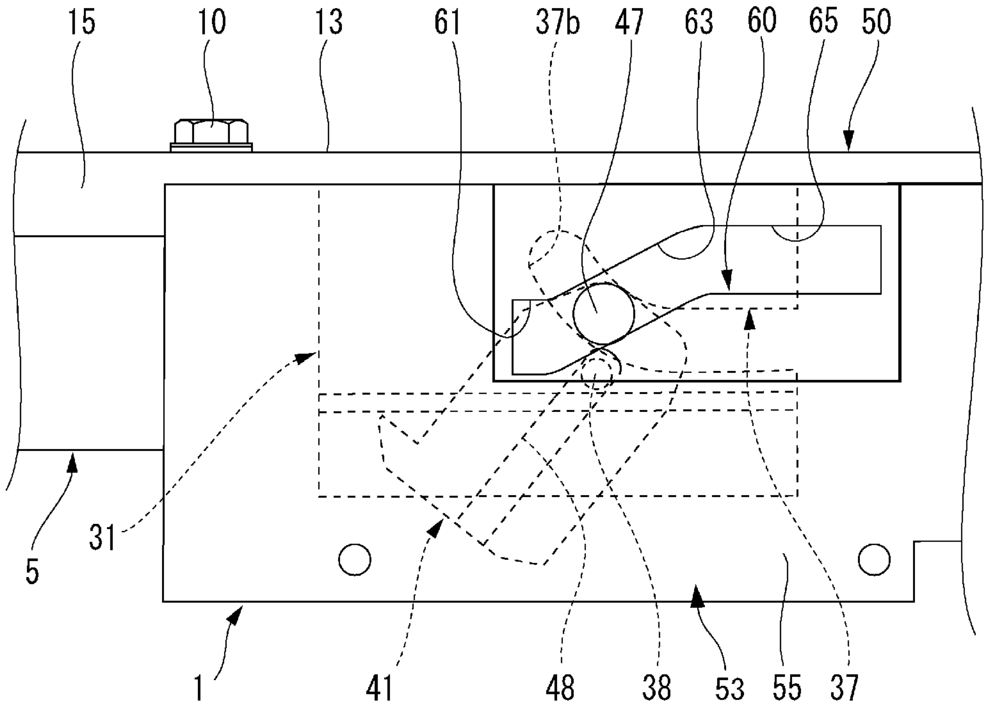
Figure 9B:
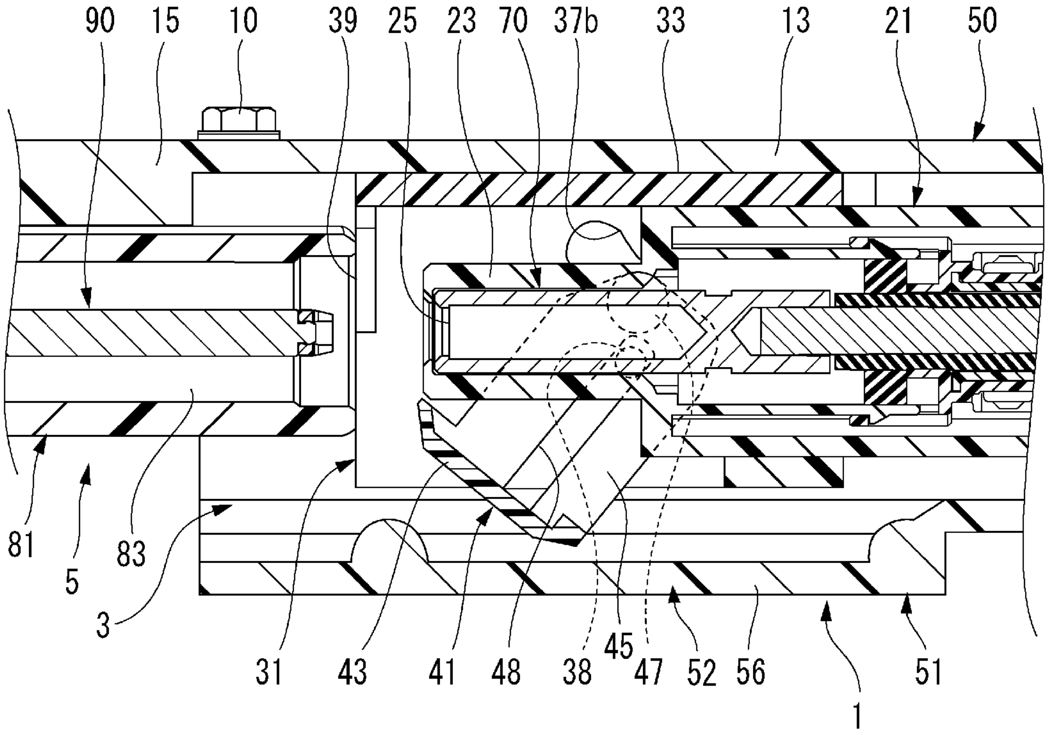

At this time, as shown in FIGS. 9A and 9B, the pressing portion 87 at the tip portion of the plug housing 81 of the inlet plug 5 abuts against the contact portion 39 at the tip portion of the movable case 31 and presses the contact portion 39 against the elastic urging force of the spring 30.

When the movable case 31 moves to a rear side opposite to the inlet plug 5 (a right side in FIGS. 9A and 9B) with respect to the outer case 51, the shutter boss 47 reaches the first rotating cam portion 37*b* of the first cam groove 37. Thus, in the shutter 41, whose rotation is supported when moving along the connector mating direction by the second cam groove 48 engaging with (following) the movable case boss 38, the shutter front wall 43 is rotated downward with the shutter boss 47 as the center of rotation.

Figure 10A:
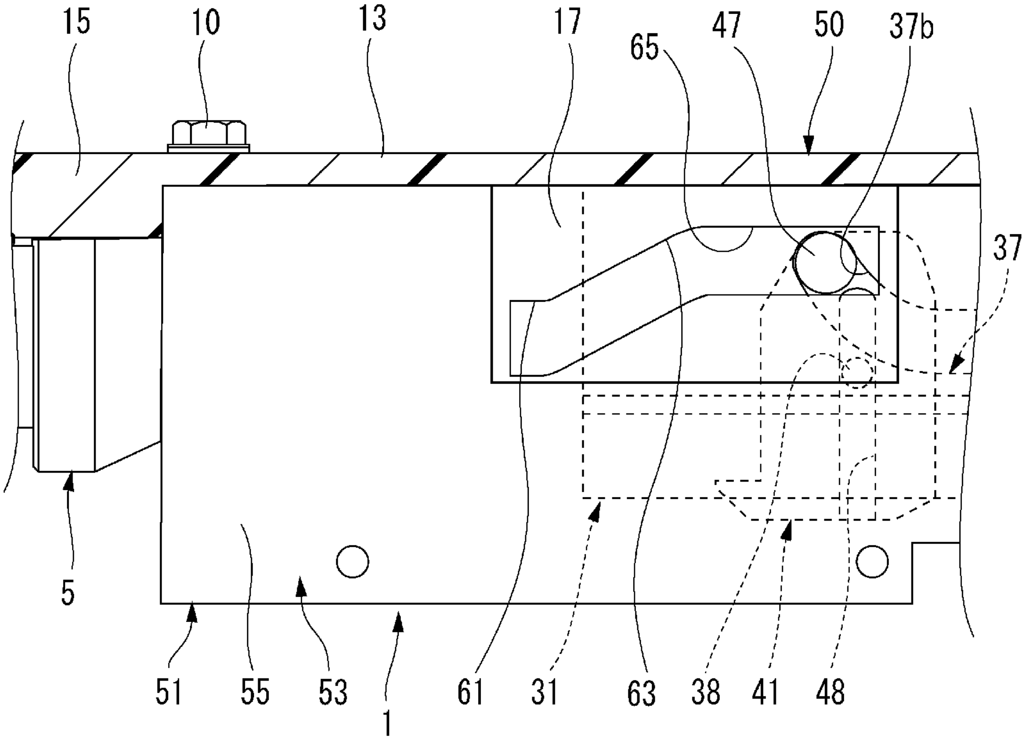
Figure 10B:
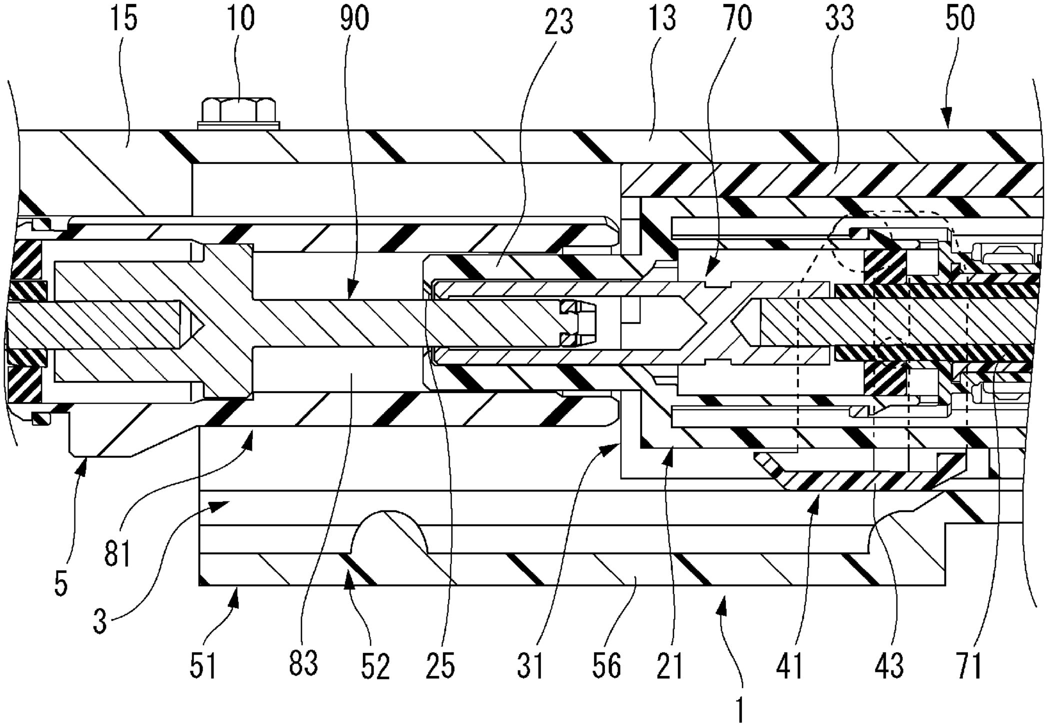
Figure 11A:
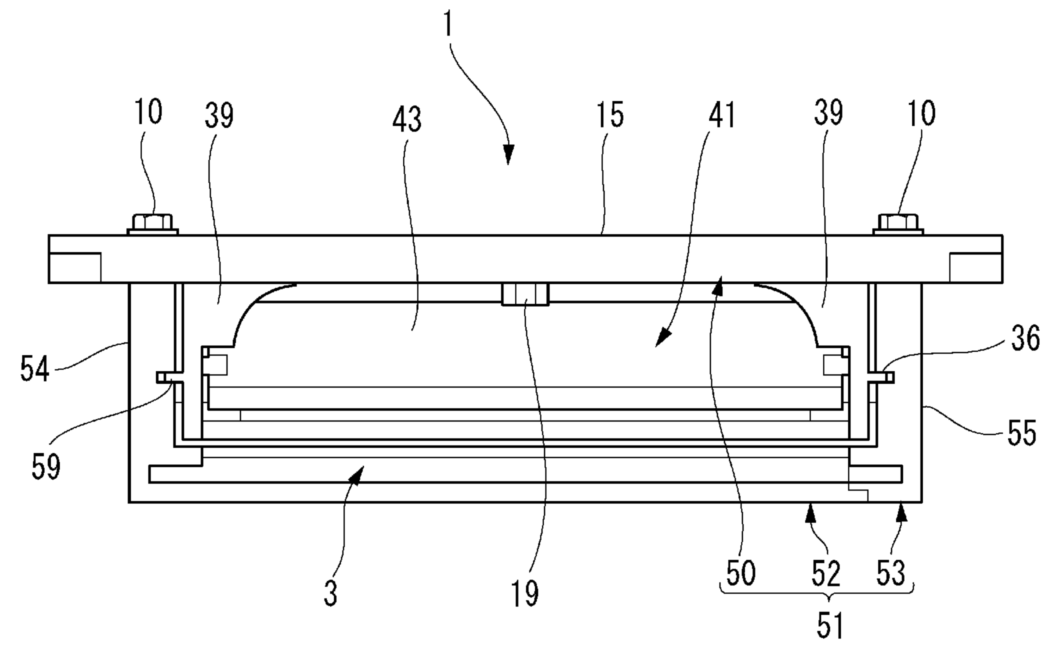
Figure 11B:
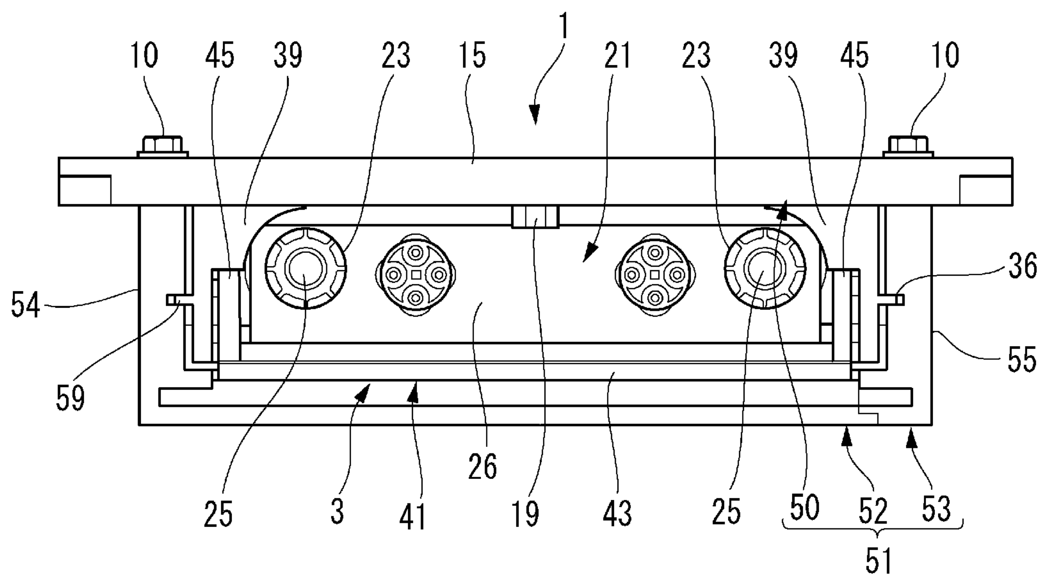

When the inlet plug 5 is further inserted deeply from this state so as to advance to the rear side of the inlet 1, as shown in FIGS. 10A, 10B, and FIG. 11B, the shutter 41 is rotated to the shutter open position where the shutter front wall 43 is parallel to the bottom wall 56 of the outer case 51. When the shutter boss 47 reaches the parallel portion 65 of the third cam groove 60, the shutter 41 moves in parallel to the rear side of the outer case 51 in a state of being rotated to the shutter open position.

Then, the connection terminal 90 of the inlet plug 5 is fitted and connected to the connection terminal 70 of the inlet 1, so that the high-voltage cable 71 and the high-voltage cable 91 are electrically connected to each other.

Therefore, the inlet 1 and the inlet plug 5 are fitted and electrically connected to each other by abutting the tip portion of the movable case 31 on the tip portion of the plug housing 81.

As described above, according to the inlet 1 according to the first embodiment, the tip portion of the inlet plug 5 rotates the shutter 41 in the opening and closing direction via the movable case 31 movably disposed in the outer case 51 in the connector fitting direction. Therefore, unlike the connector with a shutter mechanism in the related art, the inlet 1 of the first embodiment does not need to lengthen a fitting hood portion of the inlet plug in consideration of an opening and closing locus of the shutter.

The inlet 1 according to the first embodiment includes the third cam groove 60 that is provided on each side wall of the outer case 51 for moving the shutter 41 along the connector fitting direction with respect to the outer case 51 in conjunction with the movement of the movable case 31 by engaging with the shutter boss 47, the movable case boss 38 projecting to the inner surface of each of the side walls 35, 35 of the movable case, and the second cam groove 48 that is formed on each of the shutter side walls 45, 45 and engages with the movable case boss 38 to support the rotation of the shutter 41 that moves along the connector fitting direction.

Therefore, according to the inlet 1 of the first embodiment, when the inlet plug 5 is fitted, the shutter 41 whose rotation is supported by the movable case boss 38 engaging with the second cam groove 48 can move to the rear side of the outer case 51 together with the movable case 31 while smoothly rotating in an opening direction. Therefore, the shutter 41 can be easily prevented from interfering with the inlet plug 5 and can increase a degree of freedom in design.

The third cam groove 60 of the inlet 1 according to the first embodiment is provided with the third displacement cam portion 63 that moves the shutter 41 via the shutter boss 47 engaged with (following) the third cam groove 60, so that the shutter front wall 43 is displaced toward the shutter boss 47 side when the shutter 41 rotates from the shutter close position to the shutter open position.

Therefore, according to the inlet 1 of the first embodiment, when the shutter is opened, the shutter front wall 43, which is the tip of rotation (free end), is displaced toward the shutter boss 47 side (upper side), which is the center of rotation, by the third displacement cam portion 63 of the third cam groove. Therefore, when the shutter is opened, the shutter front wall 43 does not protrude to a lower side (outside) of the outer case 51, and the inlet 1 when the shutter is opened can be made compact.

The spring 30 in the inlet 1 according to the first embodiment is interposed between the spring receiving portion 34 provided on the rear end of the movable case 31 and the spring support portion 27 provided on the rear wall of the housing 21.

Therefore, according to the inlet 1 of the first embodiment, the spring 30 elastically urging the movable case 31 toward the inlet plug 5 side is arranged on the rear wall side of the housing 21 housed and held in the outer case 51, and is separated from the opening 3 of the outer case 51 (the front opening 25 of the housing 21). Therefore, the spring 30 disposed in the outer case 51 away from the opening 3 is less likely to be affected by dust, water, and the like, and it is easy to guarantee a spring function of the connector with a shutter mechanism.

In the inlet 1 according to the first embodiment, the front ends of the intersection parts between the movable case side walls 35, 35 and the movable case upper wall 33 in the movable case 31 are each provided with the contact portion 39 pressed and urged by the pressing portion 87 at the tip portion of the inlet plug 5 when the connector is fitted.

Therefore, according to the inlet 1 of the first embodiment, the pressing portion 87 at the tip portion of the inlet plug 5 presses and urges the contact portion 39 provided on each of the front ends of the intersection parts between the movable case side walls 35, 35 and the movable case upper wall 33 having relatively high rigidity. Therefore, the movable case 31 that is pressed and urged by the tip portion of the inlet plug 5 when the connector is fitted is less likely to be deformed by a pressure due to the inlet plug 5, and it is not necessary to make a thickness of the movable case 31 thicker than necessary.

Figure 12:
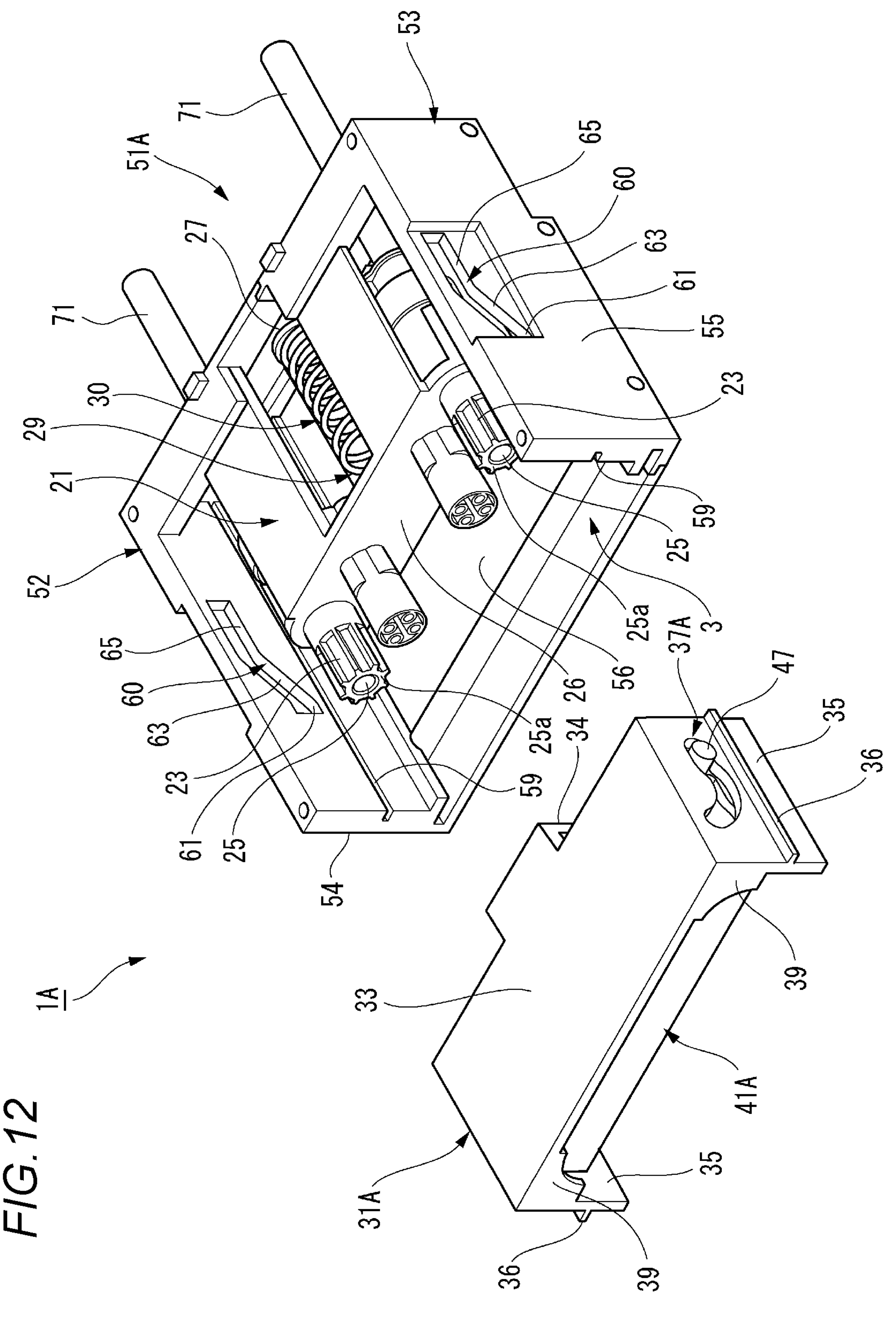
FIG. 12 is a perspective view of a state in which a movable case to which a shutter is attached is separated from an outer case in an inlet constituting a connector according to a second embodiment of the present disclosure.
Figure 13:
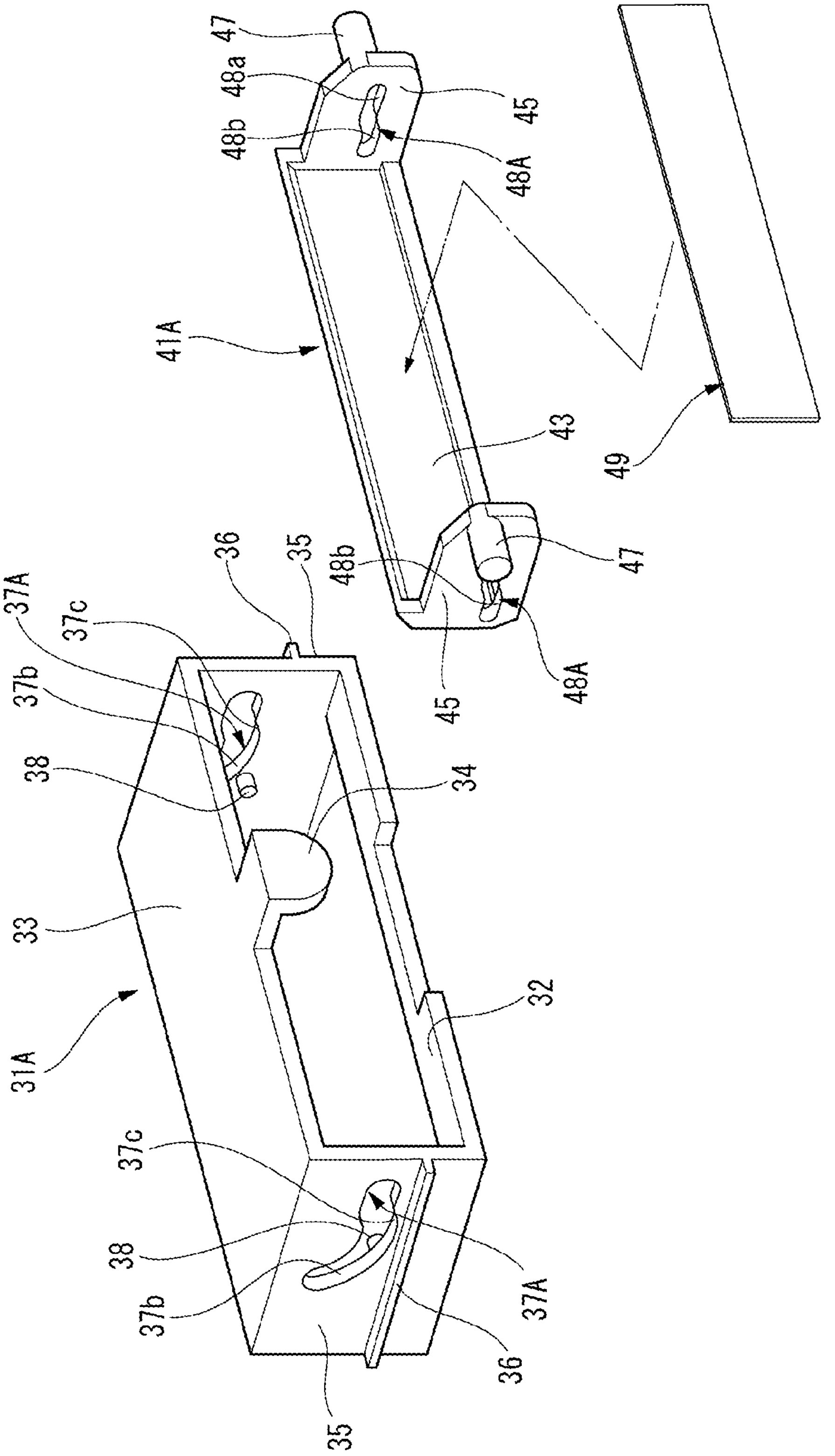
FIG. 13 is a perspective view from a rear side of the movable case and the shutter shown in FIG. 12.

FIG. 12 is a perspective view of a state in which a movable case 31A to which a shutter 41A is attached is separated from an outer case 51A in an inlet 1A constituting a connector according to a second embodiment of the present disclosure. FIG. 13 is a perspective view from a rear side of the movable case 31A and the shutter 41A shown in FIG. 12.

The inlet 1A according to the second embodiment has the same configuration as the inlet 1 of the first embodiment except that the outer case 51A, the movable case 31A, and the shutter 41A are used instead of the outer case 51, the movable case 31, and the shutter 41 in the inlet 1 of the first embodiment described above. Therefore, the same components as those of the inlet 1 of the first embodiment are designated by the same reference numerals, and detailed description thereof will be omitted.

As shown in FIG. 12, the outer case 51A in the inlet 1A according to the second embodiment is made of the first housing 52, the second housing 53, and the top plate 50 (not shown).

Each of the side wall 54 and the side wall 55, which are two side walls of the outer case 51A, is penetratingly formed with the third cam groove 60 for passively guiding the shutter boss 47 of the shutter 41A, which will be described later, along the connector fitting direction.

As shown in FIGS. 12 and 13, a first cam groove 37A is penetratingly formed on each of the movable case side walls 35, 35 of the movable case 31A. The first cam groove 37A is formed by an elongated hole extending in a front-rear direction of the movable case 31A.

The first cam groove 37A includes a first displacement cam portion formed by a horizontal portion and a curved portion extending diagonally upward (diagonally upward to a right side in FIG. 13) intersecting the third displacement cam portion 63 in a side view from an intermediate portion to a rear side (a right side in FIG. 13) of the first cam groove 37A, and a first rotating cam portion 37*b* formed by a curved portion that extends diagonally upward (diagonally upward to a left side in FIG. 13) continuous with a front end of the first displacement cam portion.

As shown in FIG. 13, the shutter front wall 43 of the shutter 41A includes the elastic packing 49 that abuts on an opening edge 25*a* of the front opening 25 of the pair of terminal accommodating cylinder portions 23, 23. The elastic packing 49 is formed of an elastic member such as a rectangular sheet-shaped sponge or rubber, and is integrally provided on an inner surface of the shutter front wall 43.

That is, the shutter 41A and the pair of terminal accommodating cylinder portions 23, 23 are configured to cover the front opening 25 in a state where the shutter front wall 43 is in contact with the opening edge 25*a* of the front opening 25 at the shutter close position.

On the shutter side wall 45, a second cam groove 48A that engages with the movable case boss 38 of the movable case 31A is formed by an elongated hole that bends and extends along a direction orthogonal to the shutter front wall 43.

The second cam groove 48A includes a second rotating cam portion 48*a* extending from an intermediate portion to a rear side (right side in FIG. 13) of the second cam groove 48A, and a second displacement cam portion 48*b* that extends diagonally downward (diagonally downward to the left side in FIG. 13) continuous with a front end of the second rotating cam portion 48*a*.

Therefore, the shutter 41A is mounted on the movable case 31A in a state where the shutter boss 47 is engaged with the corresponding first cam groove 37A and the second cam groove 48A is engaged with the corresponding movable case boss 38.

Here, functions of the first cam groove 37A of the movable case 31A, the second cam groove 48A of the shutter 41A, and the third cam groove 60 of the outer case 51A will be described.

Figure 14:
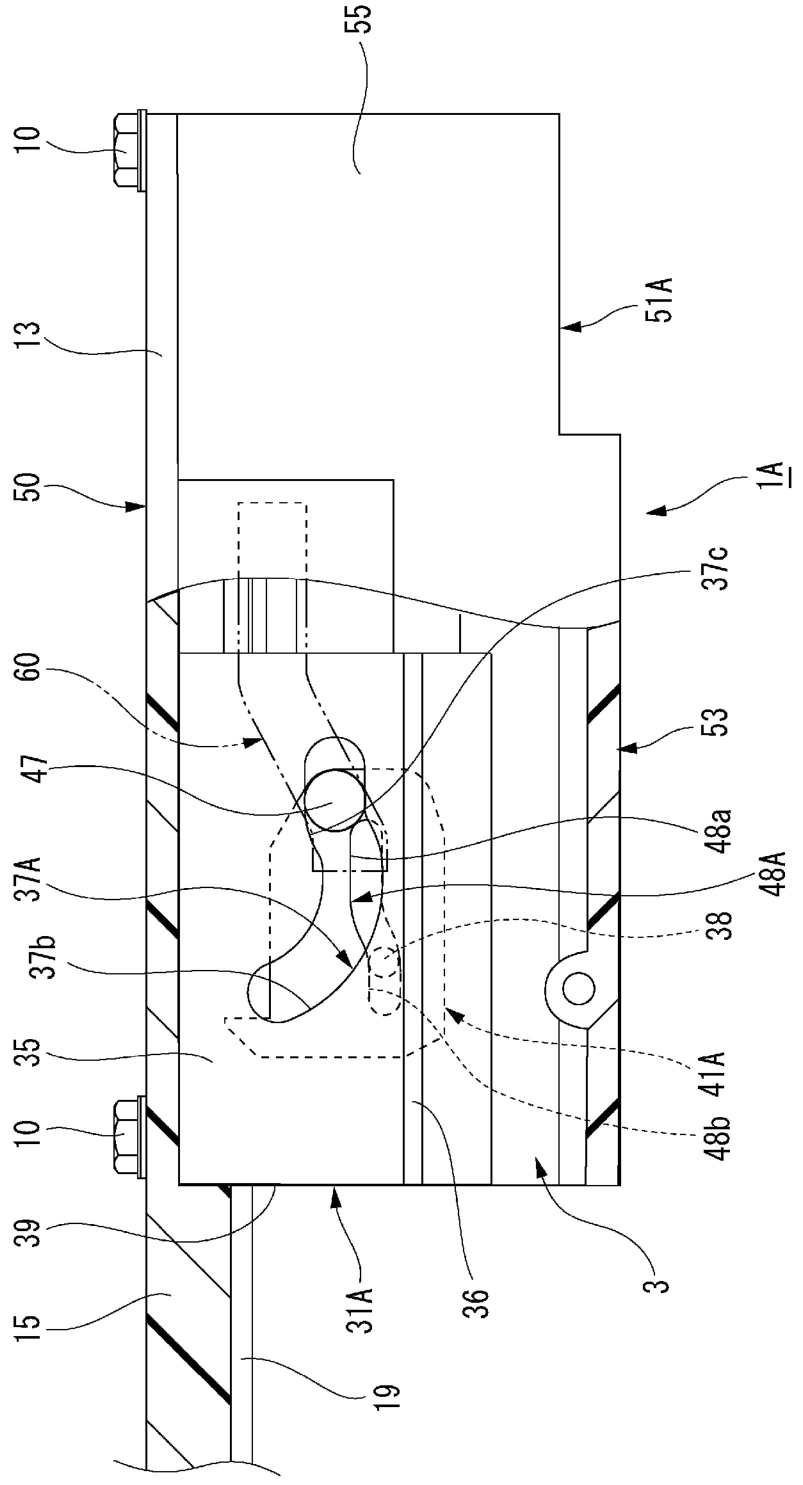
FIG. 14 is a main part enlarged side view in which a part of the inlet shown in FIG. 12 is broken.
Figure 15:
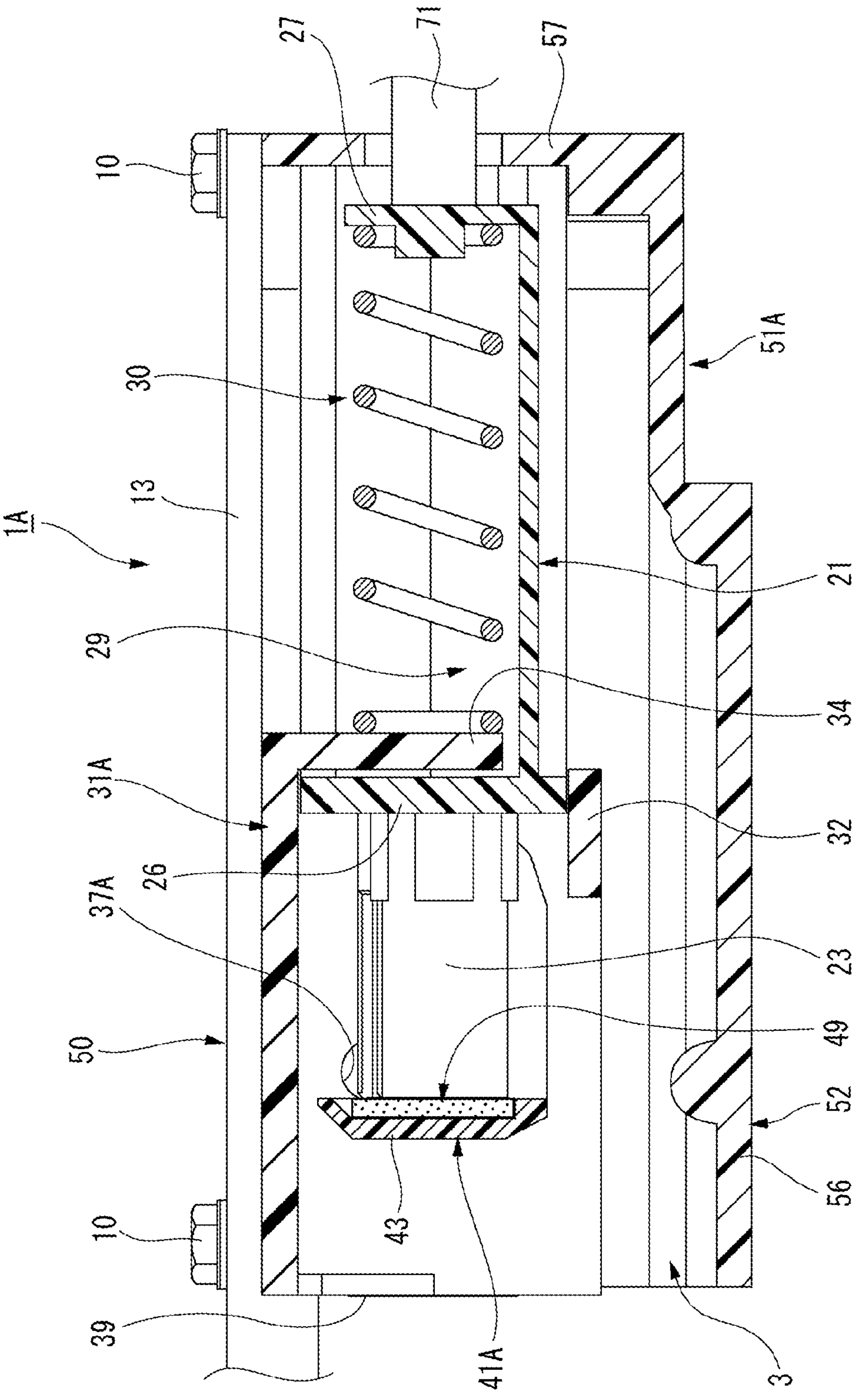
FIG. 15 is a vertical sectional view of a central portion of the inlet shown in FIG. 12.

FIG. 14 is a main part enlarged side view in which a part of the inlet 1A shown in FIG. 12 is broken. FIG. 15 is a vertical sectional view of a central portion of the inlet 1A shown in FIG. 12.

When the inlet 1A and the inlet plug 5 are not fitted to each other, as shown in FIGS. 14 and 15, the movable case 31A is located on the inlet plug 5 side with respect to the outer case 51A due to the elastic urging force of the spring 30 (left side in FIG. 15). In this case, the shutter boss 47 is located at the horizontal portion of the first displacement cam portion in the first cam groove 37A, and the tip portion thereof is located at the front end portion of the third displacement cam portion 63 in the third cam groove 60.

Therefore, the shutter 41, in which the second displacement cam portion 48*b* of the second cam groove 48A is engaged with the movable case boss 38, is at the shutter close position (see FIG. 15) in which the elastic packing 49 of the shutter front wall 43 abuts on the opening edge 25*a* of the front opening 25 of the terminal accommodating cylinder portion 23 to cover the front opening 25 of the housing 21.

When the movable case 31A moves against the elastic urging force of the spring 30 to a side opposite to the inlet plug 5 (right side in FIG. 15) with respect to the outer case 51A, first, the shutter boss 47 of the shutter 41A reaches the curved portion of the first displacement cam portion in the first cam groove 37A. Thus, the shutter boss 47 is narrowed by the third displacement cam portion 63 of the third cam groove 60 and the first displacement cam portion of the first cam groove 37A, and is displaced toward the inlet plug 5 side along the connector fitting direction. Then, the second displacement cam portion 48*b* of the second cam groove 48, which is inclined forward and diagonally downward in accordance with inclination of the curved portion of the first displacement cam portion, engages with (follows) the movable case boss 38. Therefore, the shutter 41A, whose displacement toward the inlet plug 5 side is supported by the movable case 31A, can be displaced forward and diagonally downward along the inclination of the curved portion of the first displacement cam portion while maintaining a posture parallel to the connector fitting direction (a state in which an extending direction of the shutter side walls 45, 45 are maintained parallel to the connector fitting direction).

When the movable case 31A further moves to the side opposite to the inlet plug 5 with respect to the outer case 51A, the shutter boss 47 reaches the front end portion of the first displacement cam portion in the first cam groove 37A, and the tip portion thereof reaches the reference portion 61 in the third cam groove 60. The shutter 41A, whose displacement to the inlet plug 5 side is supported by the second rotating cam portion 48*a* of the second cam groove 48 engaging with (following) the movable case boss 38, is displaced diagonally downward (diagonally downward to the left side in FIG. 15) toward the inlet plug 5 side along the connector fitting direction.

When the movable case 31A further moves to the side opposite to the inlet plug 5 with respect to the outer case 51A, the shutter boss 47 reaches the first rotating cam portion 37*b* of the first cam groove 37A. Thus, the shutter 41A, whose rotation is supported when moving along the connector mating direction by the second cam groove 48 engaging with (following) the movable case boss 38, is at the shutter open position in which the shutter front wall 43 is rotated downward with the shutter boss 47 as the center of rotation.

When the movable case 31A moves to the side opposite to the inlet plug 5 (the right side in FIG. 15) with respect to the outer case 51A, the shutter boss 47 reaches the third displacement cam portion 63 of the third cam groove 60. Therefore, in the shutter 41A rotated to the shutter open position, the shutter front wall 43, which is a rotation tip (free end), is displaced toward the shutter boss 47 side (upper side in FIG. 15), which is the center of rotation. The movable case 31A further moves to the side opposite to the inlet plug 5 with respect to the outer case 51A, and the shutter boss 47 reaches the parallel portion 65 of the third can groove 60. Thus, the shutter 41A moves in parallel to the rear side of the outer case 51A in a state of being rotated to the shutter open position.

Next, fitting of the inlet 1A and the inlet plug 5 will be described.

Figure 16A:
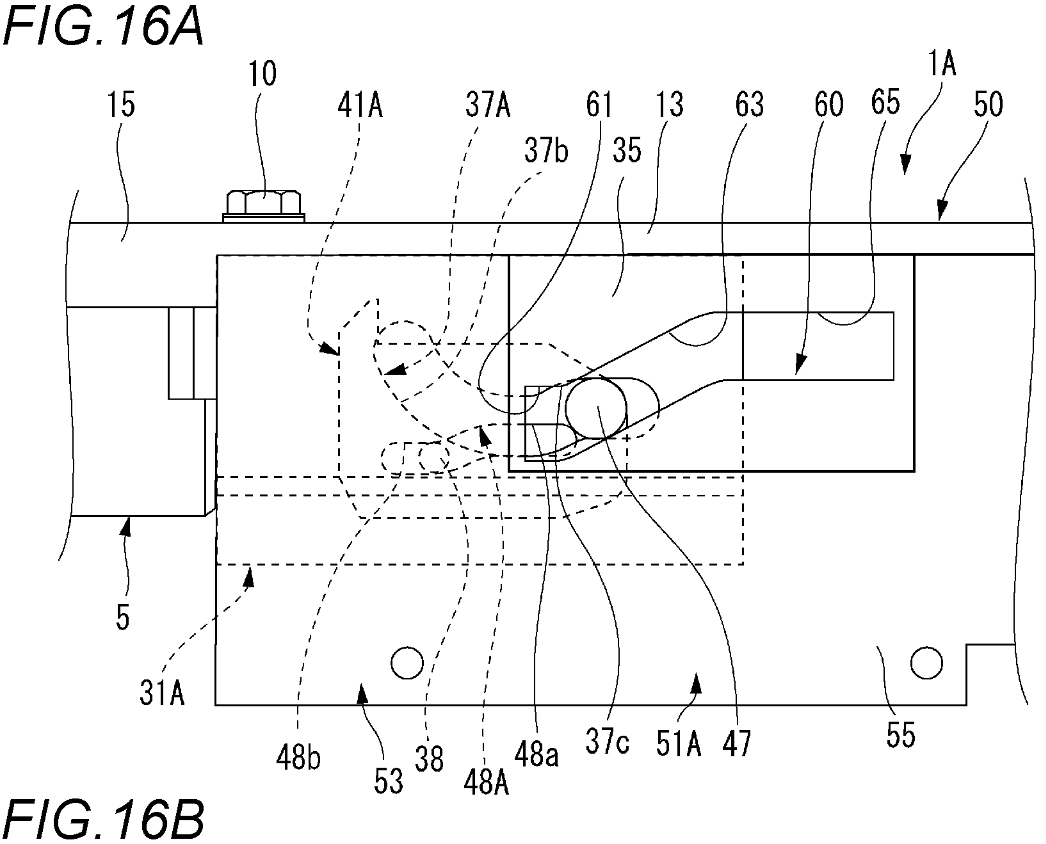
Figure 16B:
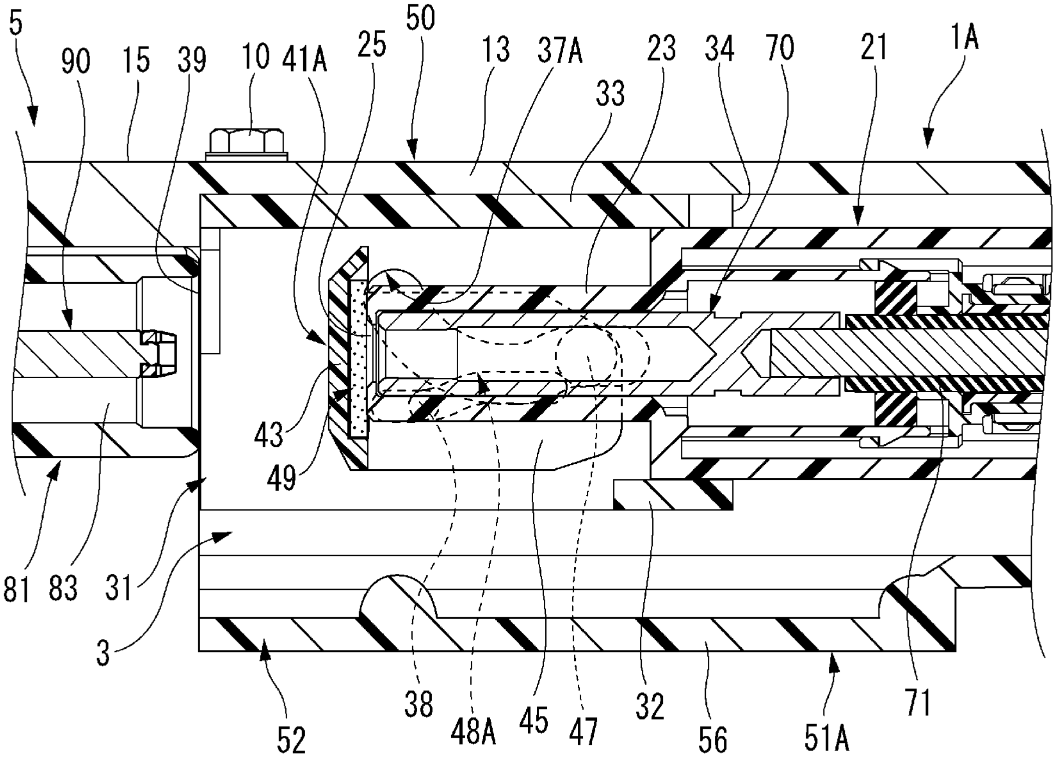
Figure 17A:
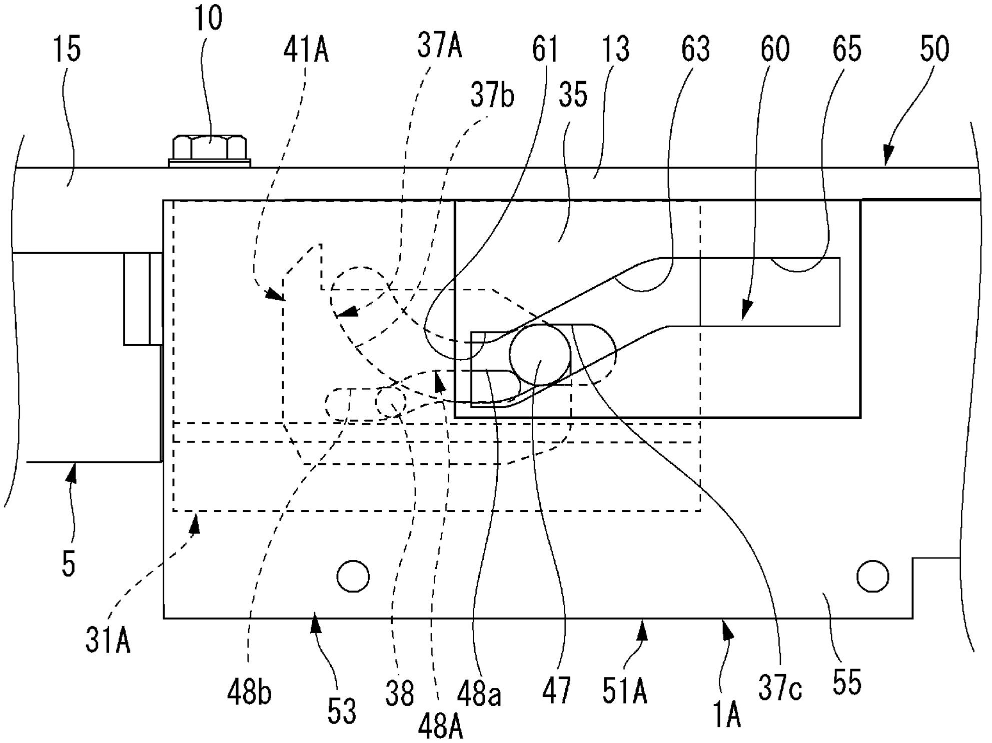
Figure 17B:
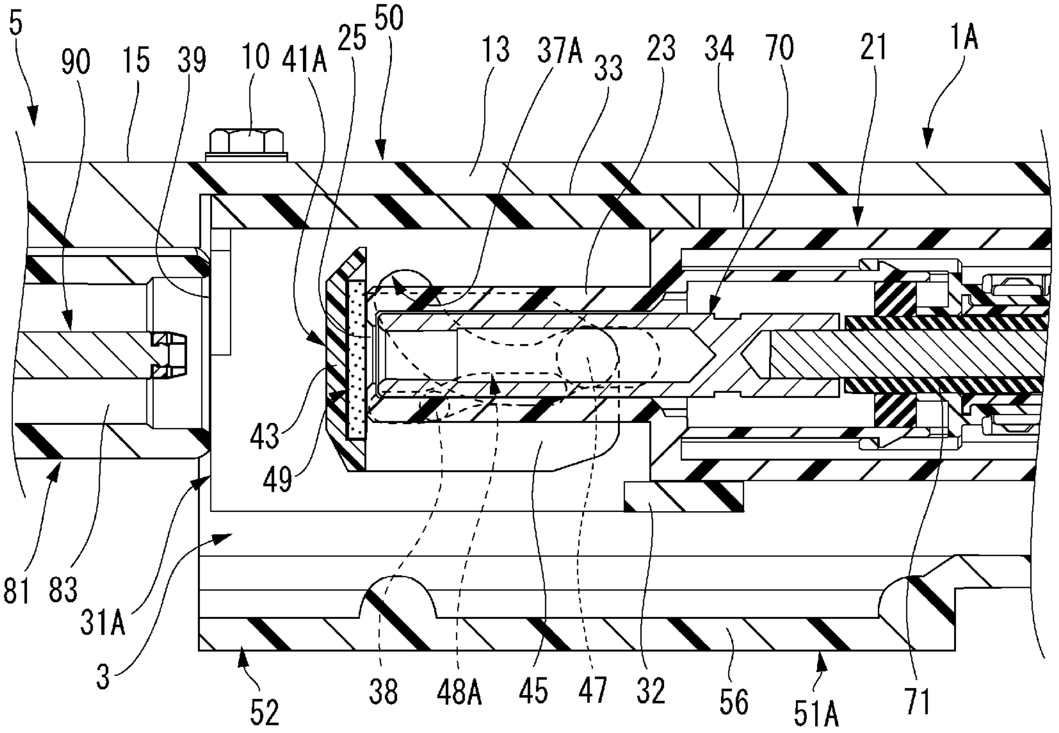
Figure 18A:
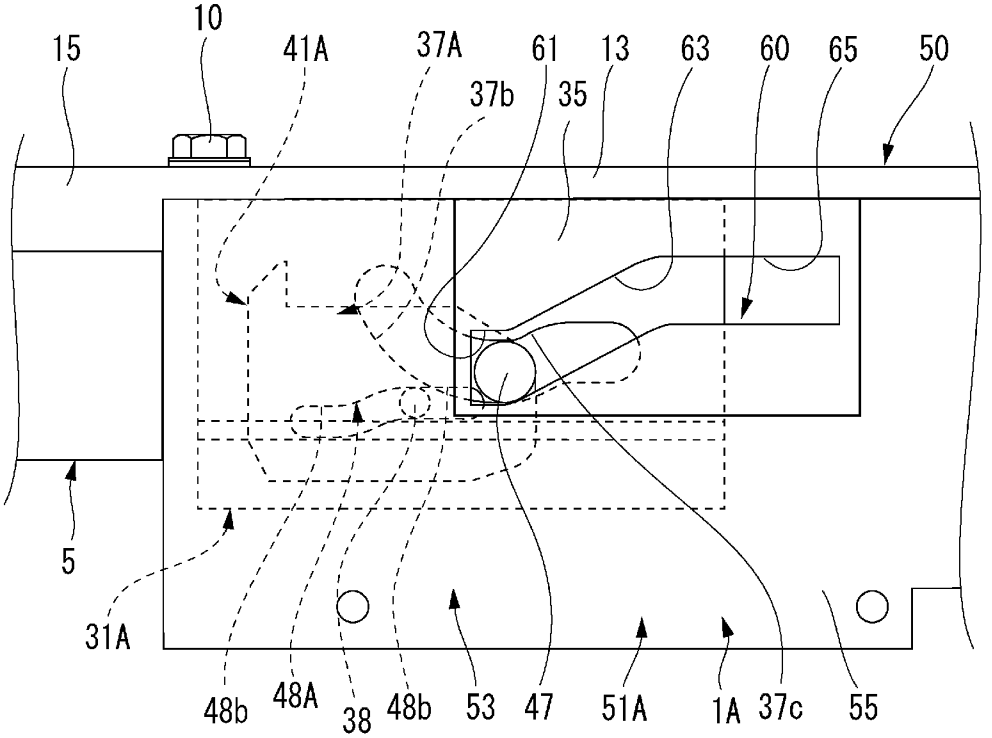
Figure 18B:
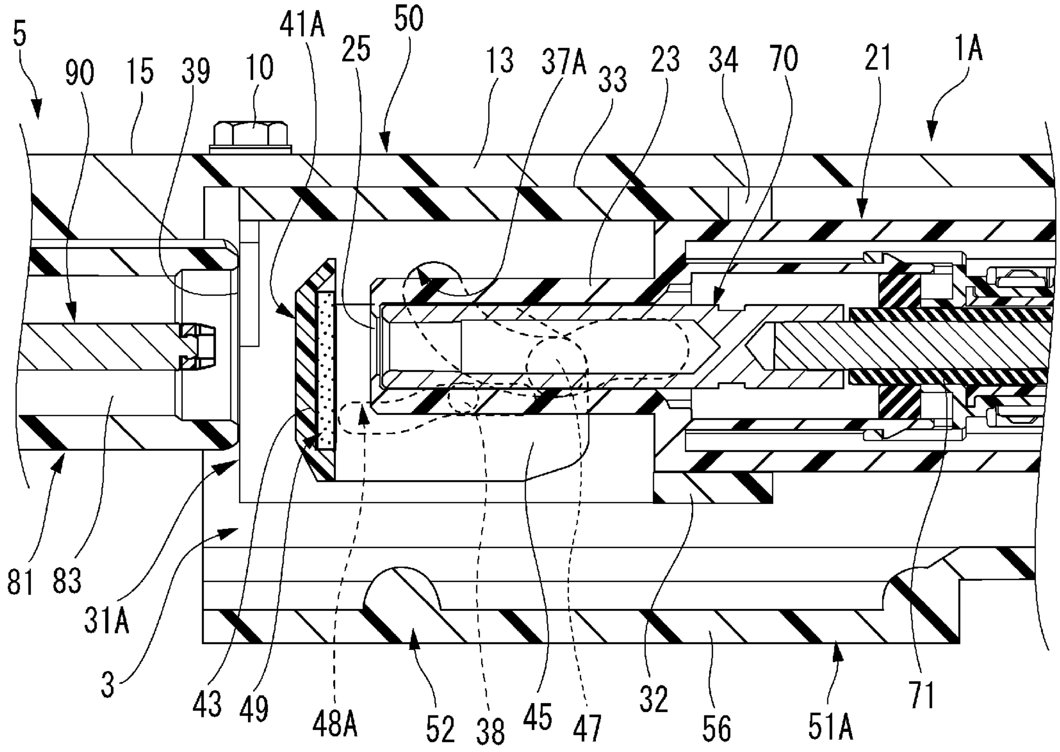
Figure 19A:
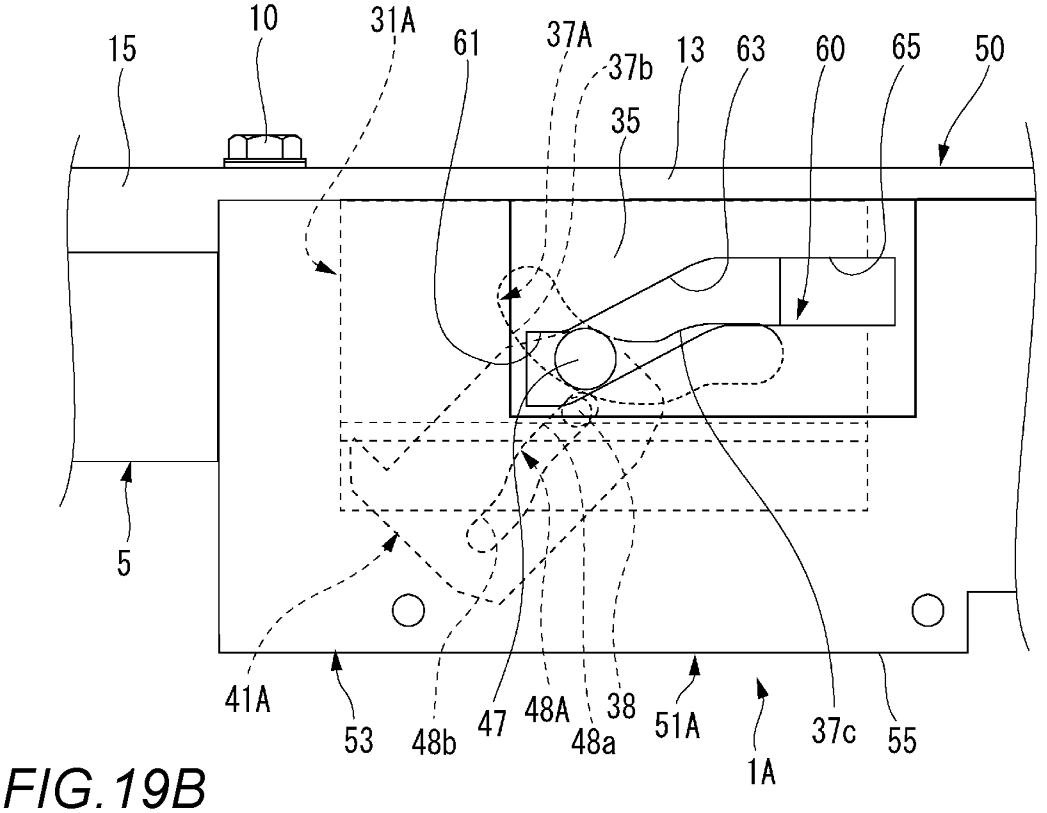
Figure 19B:
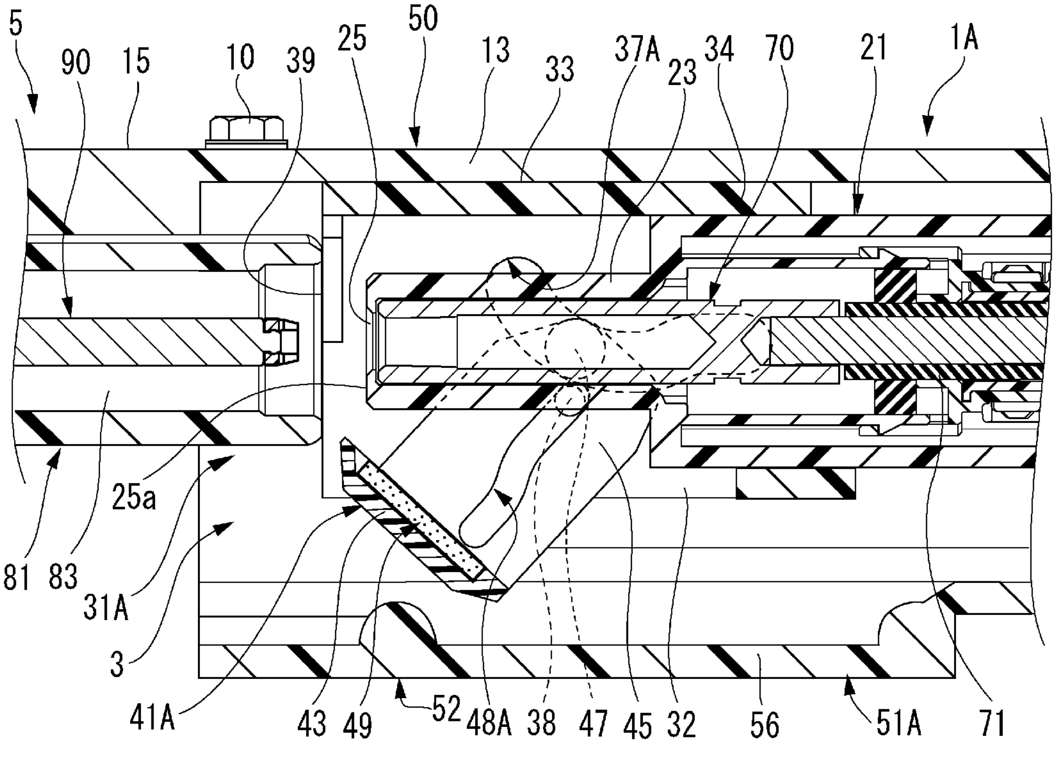
Figure 20A:
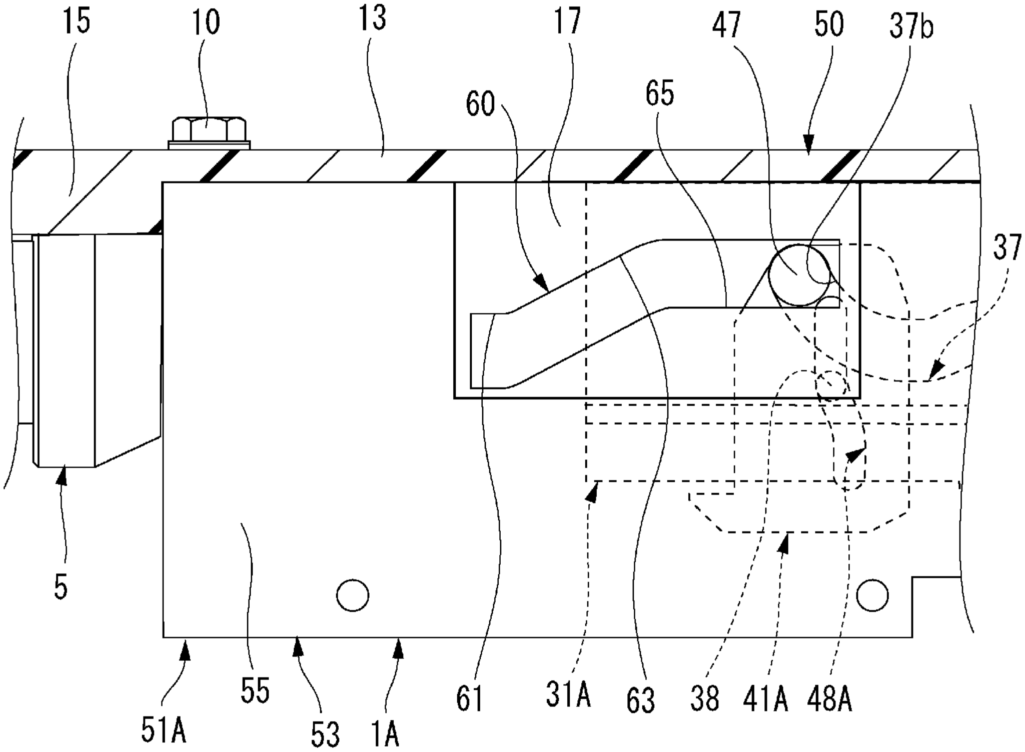
Figure 20B:
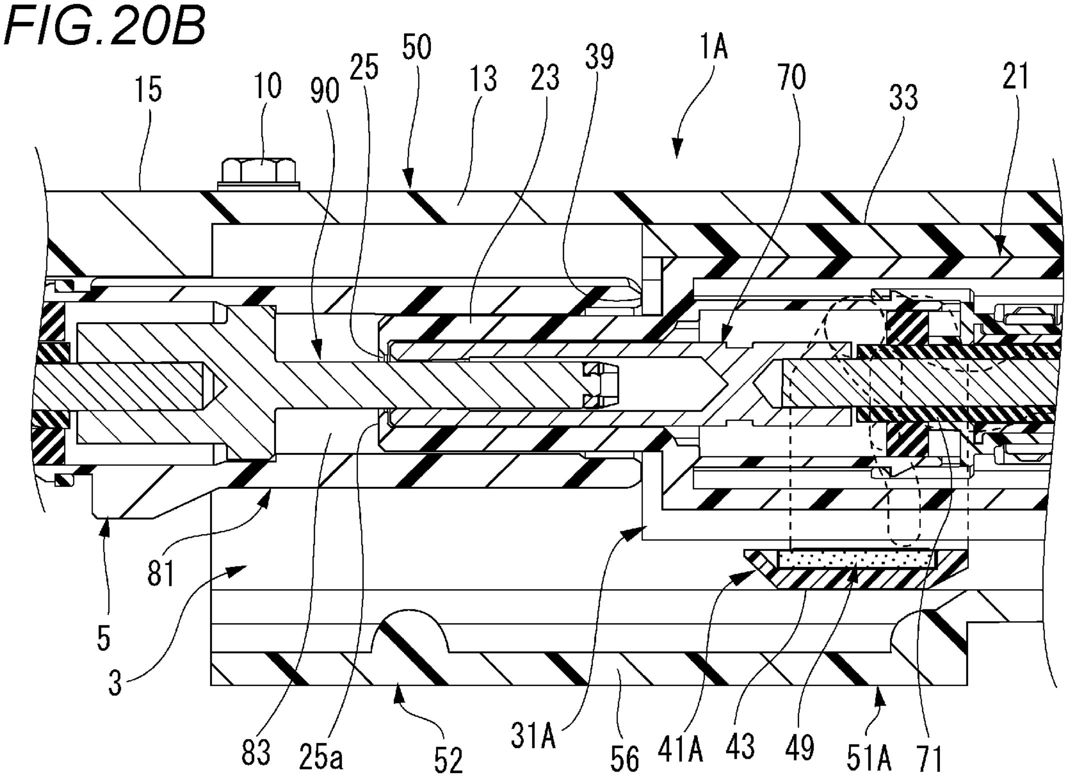

FIGS. 16A and 16B are diagrams illustrating a fitting start state of the inlet 1A according to the second embodiment of the present disclosure and the inlet plug 5, FIGS. 17A and 17B are diagrams illustrating a state immediately after fitting of the inlet 1A and the inlet plug 5, FIGS. 18A, 18B and FIGS. 19A, 19B are diagrams illustrating a state during fitting of the inlet 1A and the inlet plug 5, and FIGS. 20A and 20B are diagrams illustrating a state after fitting of the inlet 1A and the inlet plug 5.

As shown in FIGS. 16A and 16B, when the inlet 1A and the inlet plug 5 are not fitted to each other, the movable case 31A is located on the inlet plug 5 side with respect to the outer case 51A (a left side in FIGS. 16A and 16B). In this case, the shutter boss 47 is located at the horizontal portion of the first displacement cam portion in the first cam groove 37A, and the tip portion thereof is located at the front end portion of the third displacement cam portion 63 in the third cam groove 60.

Therefore, the shutter 41, in which the second displacement cam portion 48*b* of the second cam groove 48A is engaged with the movable case boss 38, is at the shutter close position (see FIG. 15) in which the elastic packing 49 of the shutter front wall 43 abuts on the opening edge 25*a* of the front opening 25 of the terminal accommodating cylinder portion 23 to cover the front opening 25 of the housing 21.

Therefore, the connection terminal 70 of the inlet 1A is not exposed due to the closed shutter 41A. In this way, the inlet 1A is dustproof, terminal protected, and electric shock protected.

From such a state, insertion and fitting of the inlet plug 5 into the inlet 1A is started. First, from the state in FIGS. 16A and 16B, the inlet plug 5 is moved to the inlet 1A side, and the insertion and fitting of the plug housing 81 into the outer case 51A is started.

At this time, as shown in FIGS. 17A and 17B, the pressing portion 87 at the tip portion of the plug housing 81 of the inlet plug 5 abuts against the contact portion 39 at the tip portion of the movable case 31A and presses the contact portion 39 against the elastic urging force of the spring 30.

When the movable case 31A moves to a rear side opposite to the inlet plug 5 (the right sides in FIGS. 17A and 17B) with respect to the outer case 51A, first, the shutter boss 47 reaches the curved portion of the first displacement cam portion in the first cam groove 37A. Thus, the shutter boss 47 is narrowed by the third displacement cam portion 63 of the third cam groove 60 and the first displacement cam portion of the first cam groove 37A, and is displaced toward the inlet plug 5 side along the connector fitting direction. That is, the first displacement cam portion extends in a direction intersecting with the third displacement cam portion 63 of the outer case 51A in a side view, and can displace the shutter boss 47 toward the inlet plug 5 side along the connector fitting direction in cooperation with the third displacement cam portion 63 immediately before the shutter 41A rotates from the shutter close position to the shutter open position.

The shutter 41A, whose displacement to the inlet plug 5 side is supported by the second displacement cam portion 48*b* of the second cam groove 48 engaging with (following) the movable case boss 38, can be displaced while maintaining a posture parallel to the connector fitting direction.

As shown in FIGS. 18A and 18B, when the movable case 31A further moves to the side opposite to the inlet plug 5 with respect to the outer case 51A, the shutter boss 47 reaches the front end portion of the first displacement cam portion in the first cam groove 37A, and the tip portion thereof reaches the reference portion 61 in the third cam groove 60. The shutter 41A, whose displacement to the inlet plug 5 side is supported by the second rotating cam portion 48*a* of the second cam groove 48 engaging with (following) the movable case boss 38, is displaced diagonally downward (diagonally downward to a left side in FIGS. 18A and 18B) toward the inlet plug 5 side along the connector fitting direction.

As shown in FIGS. 19A and 19B, when the movable case 31A further moves to the side opposite to the inlet plug 5 with respect to the outer case 51A, the shutter boss 47 reaches the first rotating cam portion 37*b* of the first cam groove 37A. Thus, the shutter 41A, whose rotation is supported when moving along the connector mating direction by the second cam groove 48 engaging with (following) the movable case boss 38, is at the shutter open position in which the shutter front wall 43 is rotated downward with the shutter boss 47 as the center of rotation.

When the movable case 31A moves to the side opposite to the inlet plug 5 (a right side in FIGS. 19A and 19B) with respect to the outer case 51A, the shutter boss 47 reaches the third displacement cam portion 63 of the third cam groove 60. Therefore, in the shutter 41A rotated to the shutter open position, the shutter front wall 43, which is the rotation tip (free end), is displaced toward the shutter boss 47 side (upper side in FIGS. 19A and 19B), which is the center of rotation. The movable case 31A further moves to the side opposite to the inlet plug 5 with respect to the outer case 51A, and the shutter boss 47 reaches the parallel portion 65 of the third cam groove 60. Thus, the shutter 41A moves in parallel to the rear side of the outer case 51A in a state of being rotated to the shutter open position.

When the inlet plug 5 is further inserted deeply from this state so as to advance to the rear side of the inlet 1A, as shown in FIGS. 20A and 20B, the shutter 41A is rotated to the shutter open position where the shutter front wall 43 is parallel to the bottom wall 56 of the outer case 51A. When the shutter boss 47 reaches the parallel portion 65 of the third cam groove 60, the shutter 41A moves in parallel to the rear side of the outer case 51A in a state of being rotated to the shutter open position.

Then, the connection terminal 90 of the inlet plug 5 is fitted and connected to the connection terminal 70 of the inlet 1A, so that the high-voltage cable 71 and the high-voltage cable 91 are electrically connected to each other.

Therefore, the inlet 1A and the inlet plug 5 are fitted and electrically connected to each other by abutting the tip portion of the movable case 31A on the tip portion of the plug housing 81.

Therefore, in addition to functions and effects of the inlet 1 according to the first embodiment described above, according to the inlet 1A of the second embodiment, immediately before the shutter 41A rotates from the shutter close position to the shutter open position, the shutter front wall 43 is displaced toward the inlet plug 5 side along the connector fitting direction via the shutter boss 47 by the first displacement cam portion of the first cam groove 37A extending in the direction intersecting with the third displacement cam portion 63 in the side view. Therefore, the shutter 41A can be configured so that the shutter front wall 43 covers the front opening 25 in a state of being in contact with the opening edge 25*a* of the front opening 25 at the shutter close position.

That is, immediately before the shutter 41A rotates from the state where the shutter front wall 43 is in contact with the opening edge 25*a* of the front opening 25 to the shutter open position, the shutter front wall 43 is displaced toward the inlet plug 5 side and separated from the opening edge 25*a* of the front opening 25. Therefore, the shutter front wall 43 that rotates to the shutter open position is not rubbed against the opening edge 25*a* of the front opening 25.

In this way, the shutter front wall 43*a* of the shutter 41A that covers the front opening 25 in the state of being in contact with the opening edge 25*a* can reliably prevent dust, water, and the like from entering the front opening 25 of the housing 21.

According to the inlet 1A of the second embodiment, the shutter 41A that is displaced toward the inlet plug 5 side along the connector fitting direction immediately before rotating from the shutter close position to the shutter open position is supported in the displacement by the movable case boss 38 engaging with the second displacement cam portion 48*b* of the second cam groove 48. Therefore, the shutter 41A that is displaced toward the inlet plug 5 side along the connector fitting direction can be displaced while maintaining a posture parallel to the connector fitting direction, and can prevent the shutter front wall 43 from hitting the opening edge 25*a* of the front opening 25 (strongly contacting a part of the opening edge 25*a*).

According to the inlet 1A of the second embodiment, the elastic packing 49 provided on the shutter front wall 43 can elastically contact with the opening edge 25*a* of the front opening 25. Therefore, the elastic packing 49 that comes into contact with the opening edge 25*a* and covers the front opening 25 can more reliably prevent dust, water, and the like from entering the front opening 25 of the housing 21.

The inlets 1 and 1A according to the above embodiments both can provide a compact connector with a shutter mechanism and a guaranteed spring function.

The present disclosure is not limited to the embodiments described above, and modifications, improvements, and the like can be made as appropriate. In addition, materials, shapes, dimensions, numbers, arrangement positions or the like of each constituent element in the embodiments described above are optional and not limited as long as the object of the present disclosure can be achieved.

For example, in the above embodiments, although an inlet used for an electric vehicle or the like as a connector with a shutter mechanism has been described as an example, the connector of the present disclosure is not limited to this, and can be applied to various connectors based on a gist of the present disclosure.

According to a first illustrative aspect of the present disclosure, a connector (inlet 1, 1A) includes: a housing (21) that houses a connection terminal (70); an outer case (51, 51A) that houses and holds the housing (21); a movable case (31, 31A) that includes first cam grooves (37,37A) formed penetratingly in side walls (35, 35) of the movable case corresponding to each of both side walls (54, 55) of the outer case (51, 51A), and that is movably disposed inside the outer case (51, 51*a*) in a connector fitting direction; a shutter (41, 41A) including a shutter front wall (43) that covers a front opening (25) of the housing (21) to which a mating connector (inlet plug 5) is fitted, shutter side walls (45, 45) provided at both end portions of the shutter front wall (43), and shutter bosses (47) projecting to outer surfaces of the shutter side walls (45, 45) and engaging with the first cam grooves (37, 37A); and a spring (30) that elastically urges the movable case (31, 31A) toward a side of the mating connector (inlet plug 5). The first cam grooves (37, 37A) engage with the shutter bosses (47), such that the shutter (41, 41A) is rotated in an opening and closing direction around the shutter bosses (47) in conjunction with the movable case (31, 31A) moving.

According to the connector of the first illustrative aspect, the tip portion of the mating connector rotates the shutter in the opening and closing direction via the movable case movably disposed in the outer case in the connector fitting direction. Therefore, unlike the connector with a shutter mechanism in the related art, the connector having the present configuration does not need to lengthen a fitting hood portion of the mating connector in consideration of an opening and closing locus of the shutter.

According to a second illustrative aspect of the present disclosure, the connector (inlet 1, 1A) may further include: third cam grooves (60) provided on the both side walls (54, 55) of the outer case (51, 51A), and engaging with the shutter bosses (47) such that the shutter (41, 41*a*) is moved along the connector fitting direction with respect to the outer case (51, 51A) in conjunction with the movable case (31, 31A) moving; movable case bosses (38) projecting to inner surfaces of the side walls (35, 35) of the movable case; and second cam grooves (48, 48A) that are formed on the shutter side walls (45, 45) of the shutter (41) and engage with the movable case bosses (38) to support a rotation of the shutter (41, 41A) that moves along the connector fitting direction.

According to the connector of the second illustrative aspect, when the mating connector is fitted, the shutter whose rotation is supported by the movable case bosses engaging with the second cam grooves can move to a rear side of the outer case together with the movable case while smoothly rotating in an opening direction. Therefore, the shutter can be easily prevented from interfering with the mating connector and can increase a degree of freedom in design.

According to a third illustrative aspect of the present disclosure, the third cam grooves (60) may include a third displacement cam portion (63) that moves the shutter (41, 41A) via the shutter bosses (47) engaged with the third cam grooves (60), such that the shutter front wall (43) is displaced toward a side of the shutter bosses (47) while the shutter (41, 41A) rotates from a close position to an open position of the shutter (41, 41A).

According to the connector of the third illustrative aspect, when the shutter is opened, the shutter front wall, which is a tip of rotation (free end), is displaced toward the shutter bosses side, which is a center of rotation, by the third displacement cam portions of the third cam grooves. Therefore, when the shutter is opened, the shutter front wall does not protrude to an outside of the outer case, and the connector when the shutter is opened can be made compact.

According to a fourth illustrative aspect of the present disclosure, the first cam grooves (37A) may include a first displacement cam portion (37*c*) that extends in a direction intersecting with the third displacement cam portion (63) in a side view and that displaces the shutter bosses (47) toward the side of the mating connector (inlet plug 5) along the connector fitting direction in conjunction with the third displacement cam portion (63) immediately before the shutter (41A) rotates from the close position to the open position of the shutter (41A).

According to the connector of the fourth illustrative aspect, immediately before the shutter rotates from the shutter close position to the shutter open position, the shutter front wall is displaced toward the mating connector side along the connector fitting direction via the shutter bosses by the first displacement cam portions of the first cam grooves extending in the direction intersecting with the third displacement cam portions in the side view. Therefore, the shutter can be configured so that the shutter front wall covers the front opening in a state of being in contact with the opening edge of the front opening at the shutter close position.

That is, immediately before the shutter rotates from the state where the shutter front wall is in contact with the opening edge of the front opening to the shutter open position, the shutter front wall is displaced toward the mating connector side and separated from the opening edge of the front opening. Therefore, the shutter front wall that rotates to the shutter open position is not rubbed against the opening edge of the front opening.

In this way, the shutter front wall of the shutter that covers the front opening in the state of being in contact with the opening edge can reliably prevent dust, water, and the like from entering the front opening of the housing.

According to a fifth illustrative aspect of the present disclosure, the second cam grooves (48A) may include a second displacement cam portion (48*b*) that supports a displacement of the shutter (41A) that is displaced toward the side of the mating connector (inlet plug 5) along the connector fitting direction immediately before the shutter (41A) rotates from the close position to the open position of the shutter (41A).

According to the connector of the fifth illustrative aspect, the shutter that is displaced toward the mating connector side along the connector fitting direction immediately before rotating from the shutter close position to the shutter open position is supported in the displacement by the movable case bosses engaging with the second displacement cam portions of the second cam grooves. Therefore, the shutter that is displaced toward the mating connector side along the connector fitting direction can be displaced while maintaining a posture parallel to the connector fitting direction, and can prevent the shutter front wall from hitting the opening edge of the front opening (strongly contacting a part of the opening edge).

According to a sixth illustrative aspect of the present disclosure, the shutter front wall (43) may include an elastic packing (49) that abuts on an opening edge (25*a*) of the front opening (25).

According to the connector of the sixth illustrative aspect, the elastic packing provided on the shutter front wall can elastically contact with the opening edge of the front opening. Therefore, the elastic packing that comes into contact with the opening edge and covers the front opening can more reliably prevent dust, water, and the like from entering the front opening of the housing.

According to a seventh illustrative aspect of the present disclosure, the spring (30) is provided between the movable case (31, 31A) and a rear wall (spring support portion 27) of the housing (21).

According to the connector of the seventh illustrative aspect, the spring that elastically urges the movable case toward the mating connector side is disposed on the rear wall side of the housing housed and held in the outer case, and is separated from an opening of the outer case (fitting opening of the housing). Therefore, the spring disposed in the outer case away from the opening is less likely to be affected by dust, water, and the like, and it is easy to guarantee a spring function of the connector with a shutter mechanism.

According to an eighth illustrative aspect of the present disclosure, the movable case (31, 31A) may include a contact portion (39) that is pressed and urged by a tip portion (pressing portion 87) of the mating connector (inlet plug 5) when the connector (1, 1A) is fitted to the mating connector (5), and the contact portion (39) may be provided at a front end of intersection parts between the side walls (35, 35) of the movable case and an upper wall (33) of the movable case.

According to the connector of the eighth illustrative aspect, the tip portion of the mating connector presses and urges the contact portion provided at the front end of the intersection part between each side wall of the movable case and the upper wall of the movable case, which has relatively high rigidity. Therefore, the movable case that is pressed and urged by the tip portion of the mating connector when the connector is fitted is less likely to be deformed by a pressure due to the mating connector, and it is not necessary to make a thickness of the movable case thicker than necessary.

The present disclosure can provide a compact connector with a shutter mechanism and a guaranteed spring function.

What is claimed is:

1. A connector, comprising:

a housing that houses a connection terminal;

an outer case that houses and holds the housing;

a movable case that includes first cam grooves formed penetratingly in side walls of the movable case corresponding to each of both side walls of the outer case, and that is movably disposed inside the outer case in a connector fitting direction;

a shutter including a shutter front wall that covers a front opening of the housing to which a mating connector is fitted, shutter side walls provided at both end portions of the shutter front wall, and shutter bosses projecting to outer surfaces of the shutter side walls and engaging with the first cam grooves; and a spring that elastically urges the movable case toward a side of the mating connector, wherein the first cam grooves engage with the shutter bosses, such that the shutter is rotated in an opening and closing direction around the shutter bosses in conjunction with the movable case moving.

2. The connector according to claim 1, further comprising:

third cam grooves provided on the both side walls of the outer case, and engaging with the shutter bosses such that the shutter is moved along the connector fitting direction with respect to the outer case in conjunction with the movable case moving;

movable case bosses projecting to inner surfaces of the side walls of the movable case; and second cam grooves that are formed on the shutter side walls of the shutter and engage with the movable case bosses to support a rotation of the shutter that moves along the connector fitting direction.

3. The connector according to claim 2, wherein the third cam grooves include a third displacement cam portion that moves the shutter via the shutter bosses engaged with the third cam grooves, such that the shutter front wall is displaced toward a side of the shutter bosses while the shutter rotates from a close position to an open position of the shutter.

4. The connector according to claim 3, wherein the first cam grooves include a first displacement cam portion that extends in a direction intersecting with the third displacement cam portion in a side view and that displaces the shutter bosses toward the side of the mating connector along the connector fitting direction in conjunction with the third displacement cam portion immediately before the shutter rotates from the close position to the open position of the shutter.

5. The connector according to claim 4, wherein the second cam grooves include a second displacement cam portion that supports a displacement of the shutter that is displaced toward the side of the mating connector along the connector fitting direction immediately before the shutter rotates from the close position to the open position of the shutter.

6. The connector according to claim 4, wherein the shutter front wall includes an elastic packing that abuts on an opening edge of the front opening.

7. The connector according to claim 1, wherein the spring is provided between the movable case and a rear wall of the housing.

8. The connector according to claim 1, wherein the movable case includes a contact portion that is pressed and urged by a tip portion of the mating connector when the connector is fitted to the mating connector, and the contact portion is provided at a front end of intersection parts between the side walls of the movable case and an upper wall of the movable case.

* * * * *